(12) United States Patent  
Williamson et al.

(10) Patent No.: US 12,409,937 B2  
(45) Date of Patent: Sep. 9, 2025

(54) SEATING ASSEMBLY WITH STAGGERED ARRANGEMENT

(71) Applicant: ZIM IP AMERICA INC., Dover (DE)

(72) Inventors: John Williamson, Greensboro, NC (US); Mitchell Rife, Greensboro, NC (US)

(73) Assignee: ZIM IP America Inc., Dover, DE (US)

( * ) Notice: Subject to any disclaimer, the term of this patent is extended or adjusted under 35 U.S.C. 154(b) by 0 days.

(21) Appl. No.: 16/499,617

(22) PCT Filed: Mar. 26, 2018

(86) PCT No.: PCT/US2018/024304  
§ 371 (c)(1),  
(2) Date: Nov. 21, 2019

(87) PCT Pub. No.: WO2018/187071  
PCT Pub. Date: Oct. 11, 2018

(65) Prior Publication Data  
US 2020/0108934 A1 Apr. 9, 2020

Related U.S. Application Data

(60) Provisional application No. 62/481,310, filed on Apr. 4, 2017.

(51) Int. Cl.  
*B64D 11/06* (2006.01)  
*B64D 11/00* (2006.01)

(52) U.S. Cl.  
CPC .... *B64D 11/0601* (2014.12); *B64D 11/00151* (2014.12); *B64D 11/0606* (2014.12);  
(Continued)

(58) Field of Classification Search  
CPC .............. B64D 11/0606; B64D 11/064; B64D 1106/0638; B64D 11/061; B64D 11/0636;  
(Continued)

(56) References Cited

U.S. PATENT DOCUMENTS

| 4,382,628 A | 5/1983 | Palmgren |
| 4,902,069 A * | 2/1990 | Lehnert .............. B64D 11/0691 297/14 |

(Continued)

FOREIGN PATENT DOCUMENTS

| EP | 1097864 A1 | 5/2001 |
| WO | 2013063599 A1 | 5/2013 |

OTHER PUBLICATIONS 18781771.3, European office action dated May 14, 2025, 6 pages.  
PCT/US2018/024304, International search report dated Feb. 7, 2018, 3 pages.

*Primary Examiner* — Ashesh Dangol  
(74) *Attorney, Agent, or Firm* — Christopher J. Volkmann; KELLY, HOLT & CHRISTENSON P.L.L.C.

(57) ABSTRACT

A seating assembly for a passenger aircraft. The seating assembly includes a plurality of passenger seats including a first passenger seat and a second passenger seat. Each of the passenger seats includes an articulated seat pan to provide for moving the passenger seat between a first upright position and a second reclined position. In addition, the second passenger seat may be positioned in a staggered configuration with respect to the first passenger seat. A fixed outer privacy shell partially surrounds each seat and includes at least one rear wall and a base attached to the floor of the passenger aircraft for receiving each of the passenger seats. In addition, a center console also may be within each of the fixed outer privacy shell and located adjacent to each of the passenger seats.

49 Claims, 21 Drawing Sheets

(52) U.S. Cl.
CPC ...... *B64D 11/0636* (2014.12); *B64D 11/0638* (2014.12); *B64D 11/0643* (2014.12)

(58) Field of Classification Search
CPC ............ B64D 11/0643; B64D 11/0601; B64D 11/00151
See application file for complete search history.

(56) References Cited

U.S. PATENT DOCUMENTS

| | | | |
|---|---|---|---|
| 8,807,481 | B2 | 8/2014 | Plant |
| 8,998,139 | B2 | 4/2015 | Dryburgh et al. |
| 2002/0017810 | A1 | 2/2002 | Dryburgh et al. |
| 2004/0004382 | A1 | 1/2004 | Dowty |
| 2004/0232283 | A1* | 11/2004 | Ferry ..................... B60N 2/309 244/118.6 |
| 2006/0075934 | A1 | 4/2006 | Ram |
| 2007/0096497 | A1* | 5/2007 | Adragna ................. B60N 2/305 296/65.16 |
| 2007/0246981 | A1 | 10/2007 | Plant |
| 2007/0283855 | A1* | 12/2007 | Pozzi ..................... B60N 3/004 108/44 |
| 2012/0139302 | A1* | 6/2012 | Estevenin .......... B64D 11/0638 297/162 |
| 2012/0223186 | A1 | 9/2012 | Henshaw |
| 2013/0032668 | A1 | 2/2013 | Foucher et al. |
| 2013/0106156 | A1* | 5/2013 | Orson .................. B64D 11/064 297/217.3 |
| 2014/0084647 | A1 | 3/2014 | Darbyshire et al. |
| 2015/0166183 | A1 | 6/2015 | Henshaw |
| 2015/0274299 | A1* | 10/2015 | Henshaw ........... B64D 11/0606 244/118.6 |
| 2016/0039525 | A1 | 2/2016 | Pajic |
| 2017/0015420 | A1 | 1/2017 | Henshaw et al. |
| 2017/0088267 | A1* | 3/2017 | Dowty .................. B64D 11/06 |

* cited by examiner

SEATING ASSEMBLY WITH STAGGERED ARRANGEMENT

This application claims the benefit of U.S. provisional application No. 62/481,310, filed on Apr. 4, 2017, which is incorporated herein by reference in its entirety.

BACKGROUND OF THE INVENTIONS

(1) Field

The present inventions relates generally to seating assemblies for passenger vehicles and, more particularly, to a seating assembly for a passenger aircraft.

(2) Related Art

Airlines are viewing cabins as brand extensions of their airport lounges, and optimizing the passenger experience for increased privacy and nesting has become top priority. Airline passengers, especially those in first and business classes, expect a multitude of features and amenities on their seat to make their journey more enjoyable and convenient.

The decline of wide body (WB) first class on many new fleets has created demand for upmarket business class suites. Innovative upmarket business class products exist in WB, but transferring those designs to a narrow body (NB) aircraft does not offer an optimal solution.

Thus, there remains a need for a new and improved seat system for a passenger aircraft which provides the comfort of an articulated seat pan while, at the same time, provides an outer privacy shell partially surrounding each passenger seat.

SUMMARY OF THE INVENTIONS

The present inventions are directed to a seating assembly for a passenger aircraft. The seating assembly includes a plurality of passenger seats including a first passenger seat and a second passenger seat. Each of the passenger seats includes an articulated seat pan to provide for moving the passenger seat between a first upright position and a second reclined position. In addition, the second passenger seat may be positioned in a staggered configuration with respect to the first passenger seat. A fixed outer privacy shell partially surrounds each seat and includes at least one rear wall and a base attached to the floor of the passenger aircraft for receiving each of the passenger seats. In addition, a center console also may be within each of the fixed outer privacy shell and located adjacent to each of the passenger seats.

In one embodiment, the seating assembly further includes an attachment point between the back of each the passenger seat and the top portion of the fixed outer privacy shell adapted to incline the passenger seat away from the fixed outer privacy shell. The attachment point may comprises a slot assembly installed onto the back of the passenger seat and a pin assembly installed onto the fixed outer privacy shell, wherein the pin assembly translocates within a slot on the slot assembly to adjust the incline of the passenger seat. The articulating seat pan preferably articulates to a distance proportional to the incline of the passenger seat.

In addition, the seat may further include a leg rest having a closed configuration and an extended configuration. The fixed outer privacy shell may be at least partially comprised of fiberglass. Also, the seat assembly may further include a foot step installed on the back of the fixed outer privacy shell adapted to facilitate a passenger exiting the passenger seat.

A cocktail tray may be inserted in between the first passenger seat and the second passenger seat within the fixed outer privacy shell.

In one embodiment, a blinder is installed on the fixed outer privacy shell and positioned adjacent to a headrest of the passenger seat. A reading light may also be installed on the blinder.

The second passenger seat preferably is offset away from the first passenger seat. In one embodiment, the second passenger seat is offset from the first passenger seat by about 12 degrees. The seating assembly may further include a third passenger seat positioned adjacent to the first passenger seat at an opposing side away from the second passenger seat, wherein the third passenger seat is substantially parallel to the first passenger seat. In another embodiment, the seating assembly further includes a fourth passenger seat positioned adjacent to the third passenger seat at an opposing side away from the first passenger seat, wherein the fourth passenger seat is positioned in a staggered configuration with respect to the third passenger seat. The fourth passenger seat may be offset away from the third passenger seat. In one embodiment, the fourth passenger seat is offset by about 12 degrees from the third passenger seat.

The seating assembly also may further include a privacy screen between the first passenger seat and the third passenger seat, wherein the privacy screen is adapted to be movable between a first storage position and a second deployed position.

In one embodiment, the seating assembly further includes a stowable tray installed onto the center console, wherein the stowable tray is adapted to be positioned between a first stowable position and a second deployed position. In addition, the seating assembly may further including a literature pocket installed below an armrest of the passenger seat and adjacent to the center console. Also, the seating assembly may further include a storage unit on the center console, the storage unit having an open configuration adapted to insert and remove one or more items and a closed configuration adapted to stow and secure the items.

In one embodiment, a storage space is installed onto the back of the fixed outer privacy shell behind the passenger seat and adapted to store electronic devices and literature. A display may be located within the storage space.

In one embodiment, the seating assembly may also include a stowable clamshell holder for a personal electronic device adapted to be movable between a first stowable position and a second deployed position, wherein the storage space is accessible when the stowable clam shell holder is in the second deployed position. The stowable clamshell holder may be adapted to hold a first personal electronic device having a first size and a second personal electronic device having a second size. Also, a cavity may be installed on the stowable clamshell holder adapted for holding a beverage.

In one embodiment, the seating assembly may further include a power outlet installed onto the fixed outer privacy shell. The power outlet may comprise a USB power outlet.

Accordingly, one aspect of the present inventions is to provide a seating assembly for a passenger aircraft, the seating assembly including (a) at least one passenger seat having an articulated seat pan to provide for moving the passenger seat between a first upright position and a second reclined position; and (b) a fixed outer privacy shell partially surrounds each seat and includes at least one rear wall and a base attached to the floor of the passenger aircraft for receiving the passenger seat.

Another aspect of the present inventions is to provide a seating assembly for a passenger aircraft including (a) a plurality of passenger seats including a first passenger seat and a second passenger seat, each of the passenger seats having an articulated seat pan to provide for moving the passenger seat between a first upright position and a second reclined position, and wherein the second passenger seat is positioned in a staggered configuration with respect to the first passenger seat; and (b) a fixed outer privacy shell partially surrounds each seat and includes at least one rear wall and a base attached to the floor of the passenger aircraft for receiving the passenger seats.

Still another aspect of the present inventions is to provide a seating assembly for a passenger aircraft, the seating assembly including (a) a plurality of passenger seats including a first passenger seat and a second passenger seat, each of the passenger seats having an articulated seat pan to provide for moving the passenger seat between a first upright position and a second reclined position, and wherein the second passenger seat is positioned in a staggered configuration with respect to the first passenger seat; (b) a fixed outer privacy shell partially surrounds each seat and includes at least one rear wall and a base attached to the floor of the passenger aircraft for receiving each of the passenger seats; and (c) a center console within each of the fixed outer privacy shell and located adjacent to each of the passenger seats.

These and other aspects of the present inventions will become apparent to those skilled in the art after a reading of the following description of embodiments when considered with the drawings.

DESCRIPTION OF THE EMBODIMENTS

Figure 1:
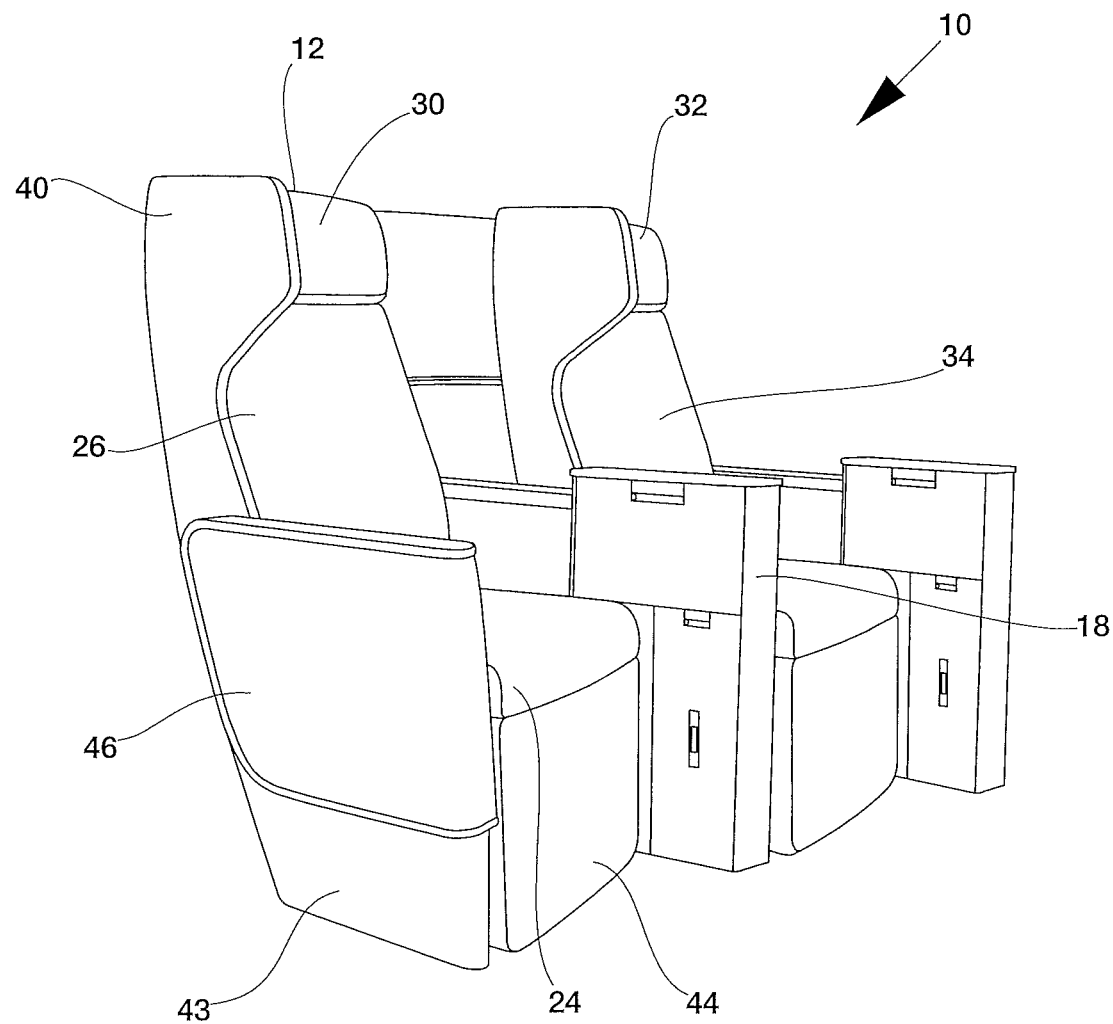
FIG. 1 is a front perspective view of one embodiment of a seating assembly constructed according to the present inventions.

In the following description, like reference characters designate like or corresponding parts throughout the several views. Also in the following description, it is to be understood that such terms as "forward," "rearward," "left," "right," "upwardly," "downwardly," and the like are words of convenience and are not to be construed as limiting terms.

Figure 2:
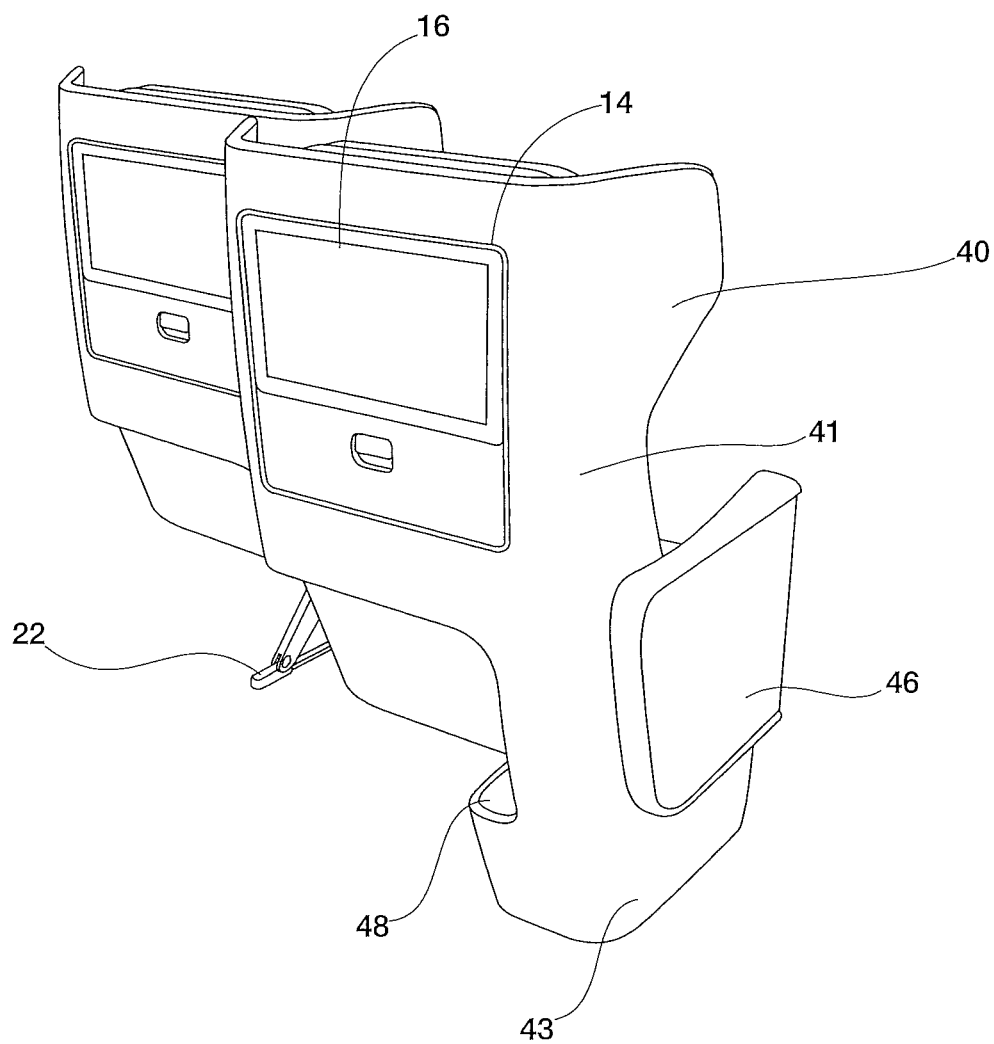
FIG. 2 is a rear perspective view of the embodiment shown in FIG. 1.

Referring now to the drawings in general and FIG. 1 in particular, it will be understood that the illustrations are for the purpose of describing a preferred embodiment of the inventions and are not intended to limit the inventions thereto. As best seen in FIGS. 1 and 2, a seating assembly, generally designated 10, is shown constructed according to the present inventions. The seating assembly 10 includes at least one passenger seat 12 and a fixed outer privacy shell 40 for receiving passenger seat 12. Fixed outer shell 40 includes at least one rear wall 41 and a base 43 attached to the floor of a passenger aircraft, and is adapted for receiving passenger seat 12. Fixed outer shell 40 may be comprised of various materials, including for example, fiberglass. In some embodiments, fixed outer shell 40 may include a foot step 48 to facilitate passengers with exiting passenger seat 12.

Each of the passenger seats 12 may include a base frame 22, a seat bottom support assembly 24 attached to a base frame and a backrest 26 attached to the base frame 22 adjoining the seat component 24. The backrest 26 may further include a headrest 30. In one embodiment headrest 30 is adjustable to accommodate the height of a passenger. A seat back bezel 14 is attached to the back of the fixed outer shell 40. Some embodiments may further include a display 16 attached to the back of the fixed outer shell 40. The display 16 may adjoin the seat back bezel 14. The passenger seat 12 may further include an upholstery package generally designated 32 and may also include a trim package generally designated 34.

Figure 3A:
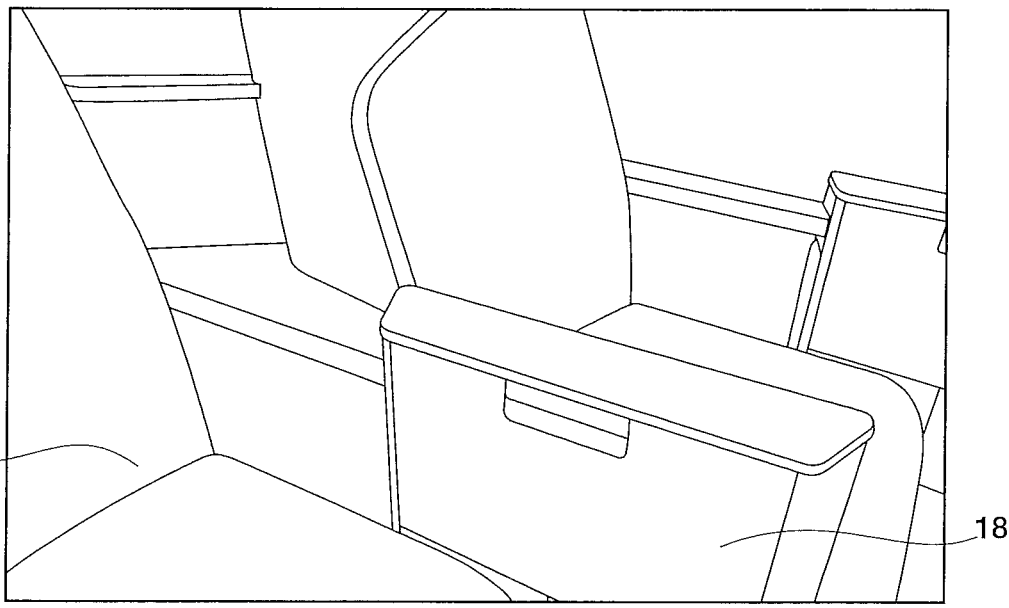
FIG. 3A is an enlarged perspective view of one embodiment including a center console.
Figure 3B:
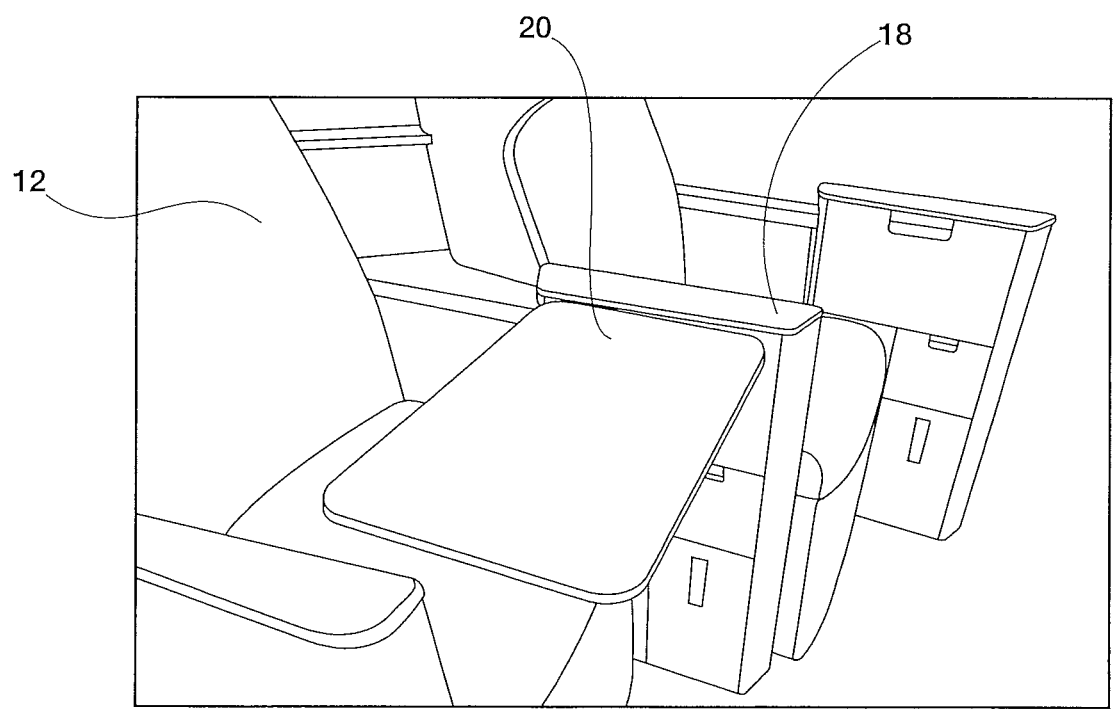
FIG. 3B is an enlarged perspective view of the embodiment in FIG. 3A with a stowable stray deployed.

Turning to FIGS. 3A and 3B, there is shown a close up view of the seating assembly 10 constructed according to the present inventions. As seen in FIG. 3B, a stowable tray 20 may be attached to a center console 18 within fixed outer shell 40 and adjacent to passenger seat 12, and may be movable between a first stowable position and a second deployed position. In the stowable position, as shown in FIGS. 1 and 3A, stowable tray 20 remains completely concealed. In other embodiments, stowable tray 20 may be installed on an armrest of passenger seat 12.

Figure 4A:
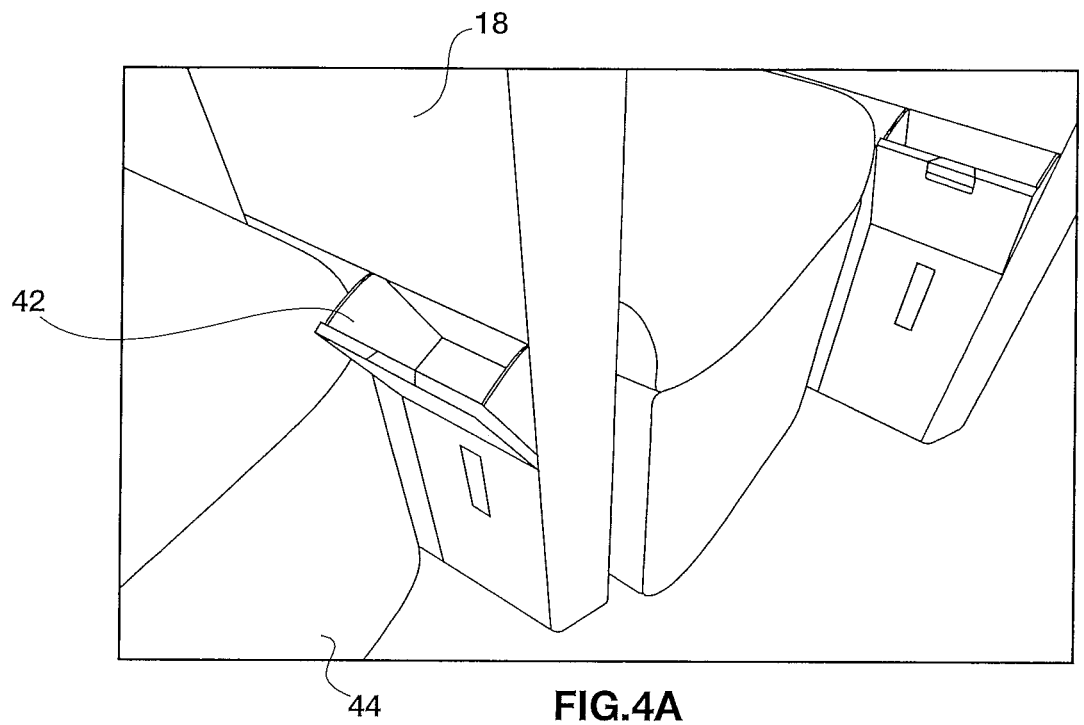
FIG. 4A is an enlarged perspective view of one embodiment including a center console having a storage unit.
Figure 4B:
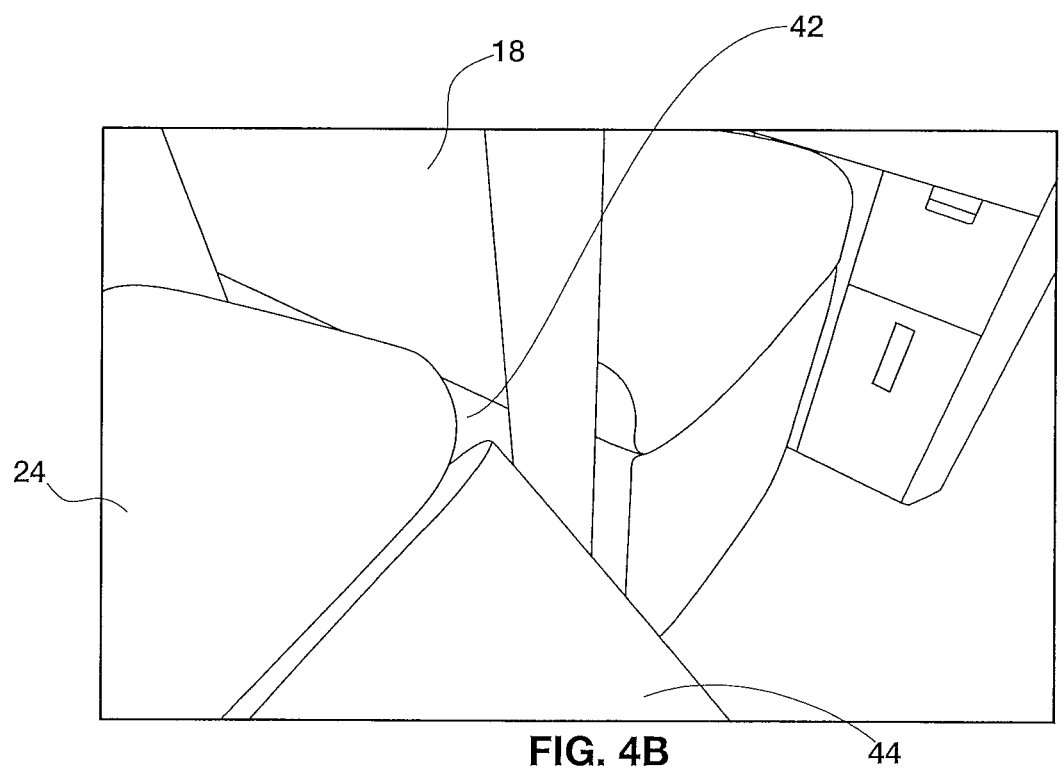
FIG. 4B is an enlarged perspective view of the embodiment in FIG. 4A with the storage unit partially obstructed by a seat bottom support assembly.

Center console 40 may also include a storage unit 42 for storing personal items. In the embodiment shown in FIGS. 4A and 4B, storage unit 42 may comprise a drawer adapted to swivel between an open configuration (FIG. 4A) and a closed configuration (FIG. 4B). As seen in FIG. 4B, storage unit 42 may be concealed by reclining the seat or extending leg rest 44.

Figure 5:
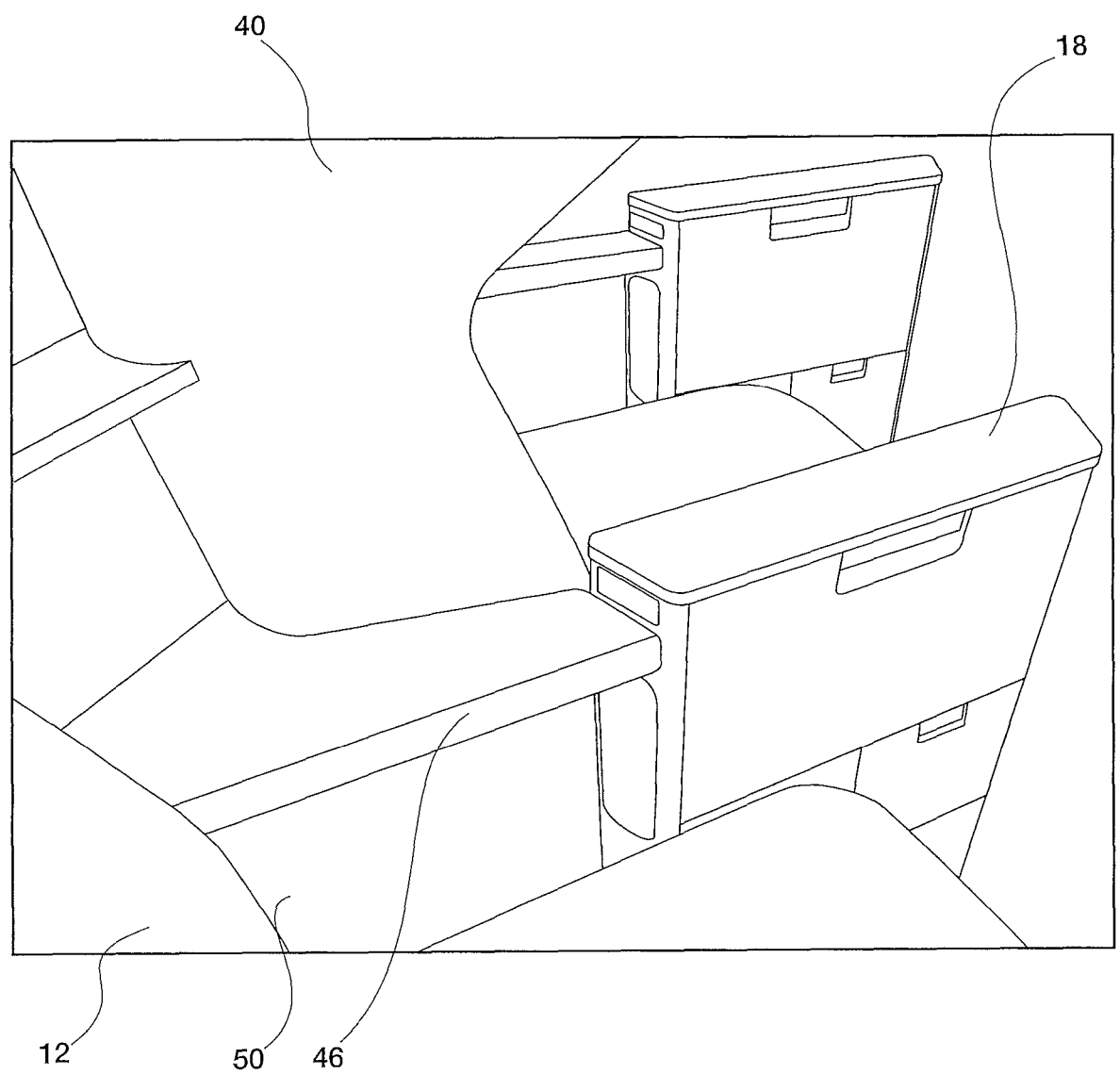
FIG. 5 is an enlarged perspective view of another embodiment having a literature pocket.

Items such as literature materials may also be stored in a literature pocket 50. FIG. 5 shows one embodiment wherein seating assembly 10 includes a literature pocket 50 installed below armrest 46 and adjacent to center console 18. In the embodiment shown, literature pocket 50 gives users the option of having additional seating space by increasing the room available when no literature items are stored in literature pocket 50. For example, literature pocket 50 may provide about 3 inches of additional hip space when no items are stored.

Figure 6A:
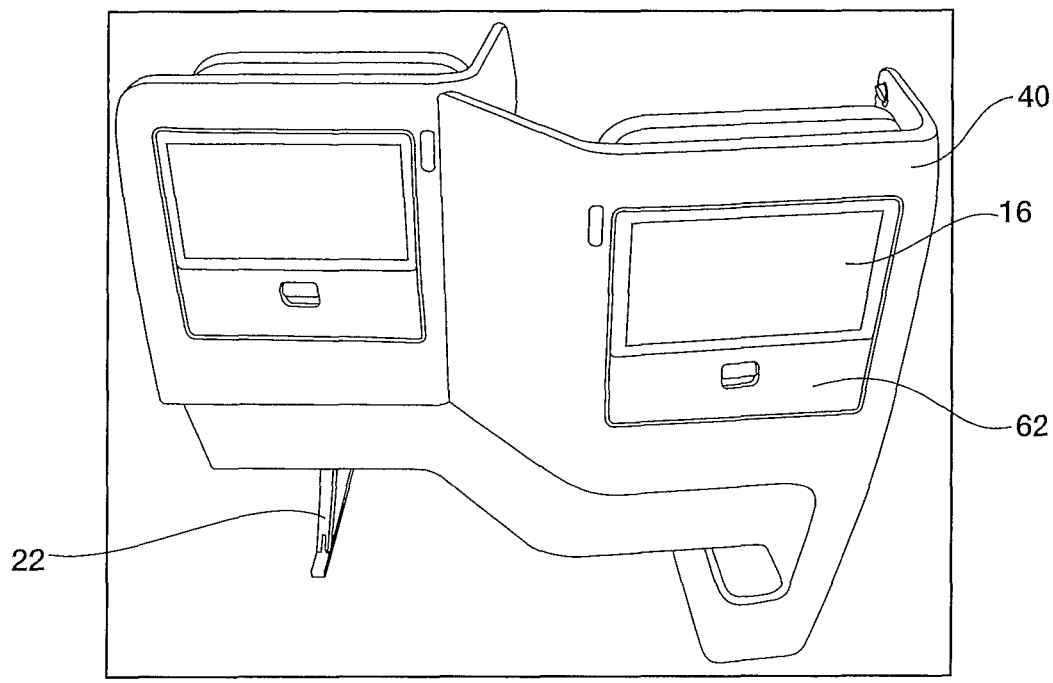
FIG. 6A is a rear perspective view of one embodiment including a storage space in a closed configuration.
Figure 6B:
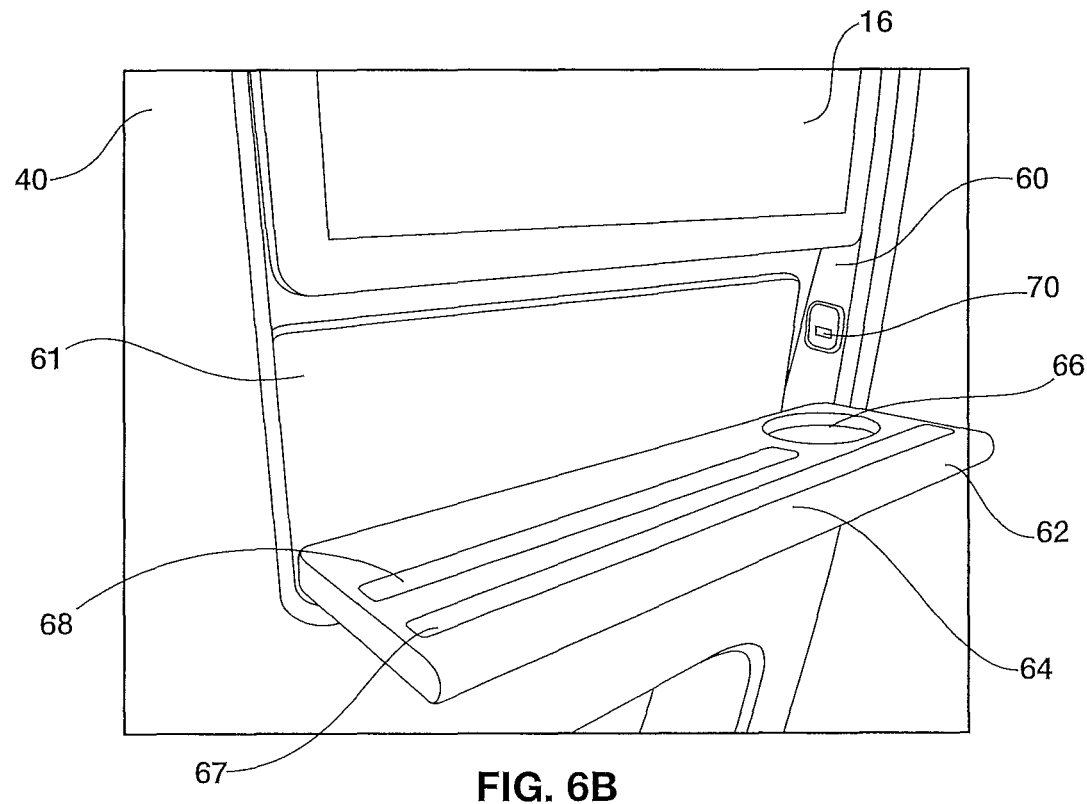
FIG. 6B is a rear enlarged perspective view of the embodiment in FIG. 6A with the storage space in an open configuration.

Seating assembly 10 may further include a storage space 60 for inserting other items. Turning to FIGS. 6A and 6B, seating assembly 10 includes a storage space 60 installed onto the back of fixed outer shell 40. Storage space 60 may be sized to store personal electronic devices (PEDs), such as laptops and tablets. As seen in FIG. 6B, storage space 60 may be sized to fit a 15-inch laptop 61. Storage space 60 may also include a power outlet 70, such as a USB port. Display 16 may be installed at an upper end within storage space 60, and a door 62 may be used to access/conceal storage space 60.

Figure 7:
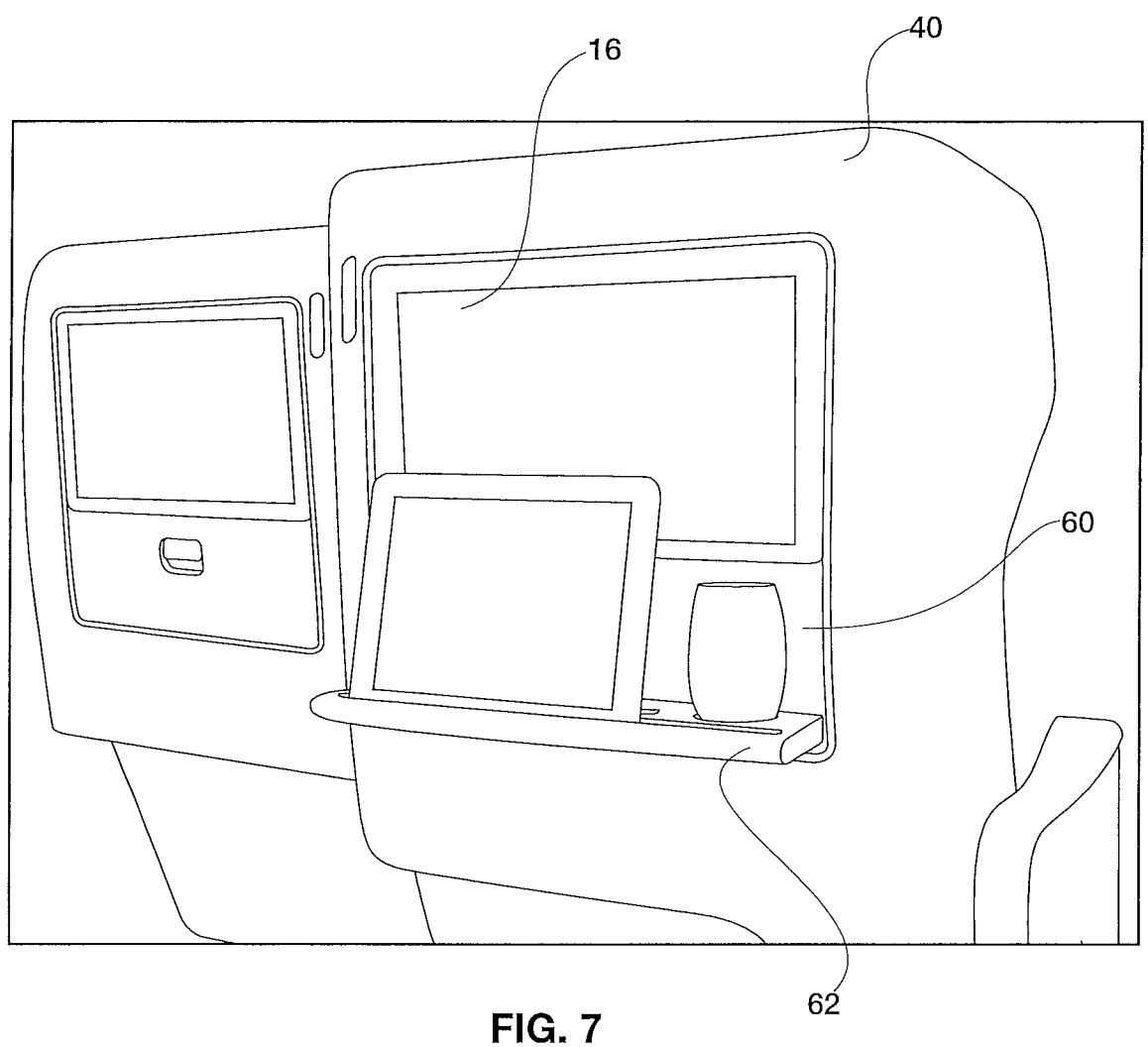
FIG. 7 is a rear enlarged perspective view of the embodiment in FIG. 6A with a personal electronic device and a beverage placed in a stowable clamshell holder.

As best seen in FIG. 6B, a stowable clamshell holder 62 may be used as a door in combination with storage space 60. In the embodiment shown in FIGS. 6B and 7, stowable clamshell holder 62 may include a personal electronic device (PED) holder 64 and a beverage holder 66. PED holder 64 may comprise a cavity 67 adapted to receive a PED, and may further include a second cavity 68 adapted to receive a PED having a different size. Second cavity 68 may also be used to receive a stand to support a PED held within cavity 67.

Figure 8:
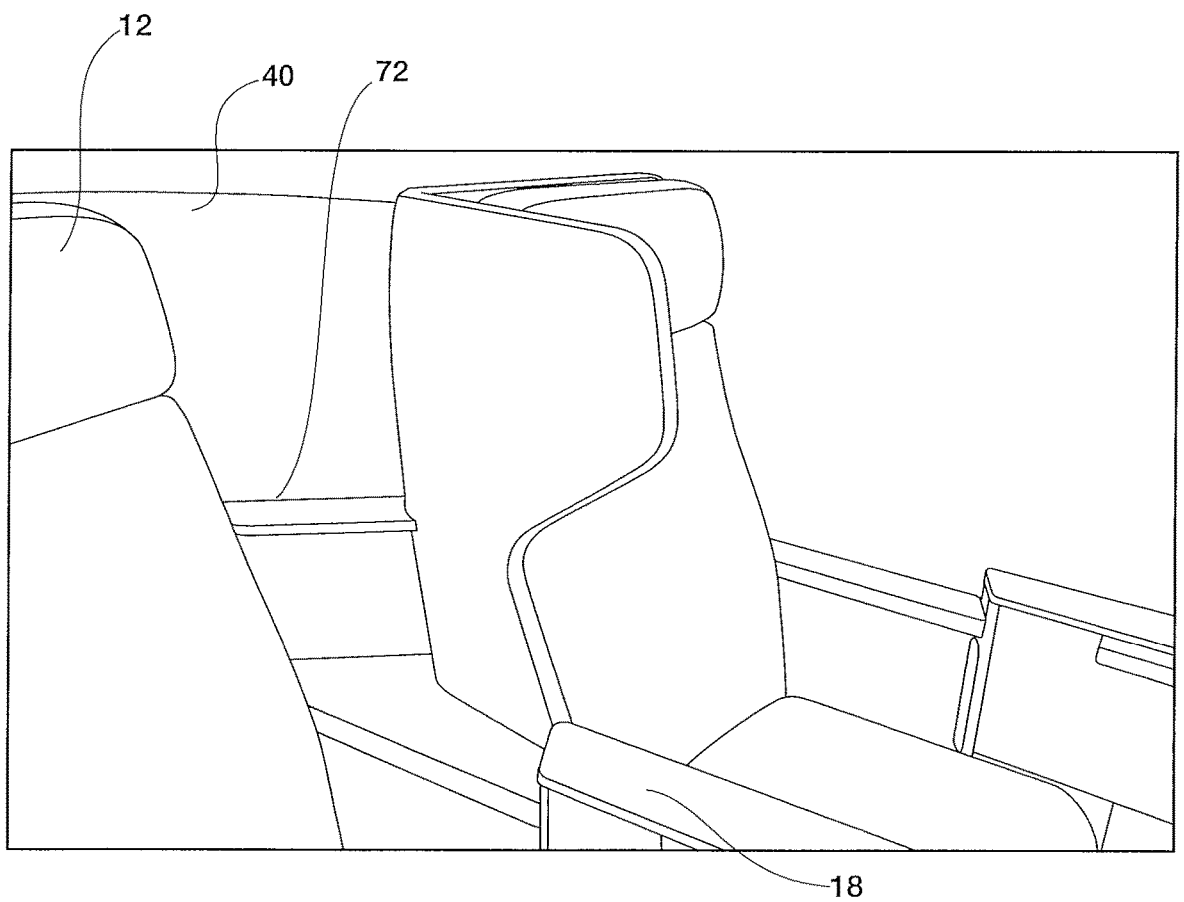
FIG. 8 is an enlarged perspective view of another embodiment including a cocktail tray.
Figure 9:
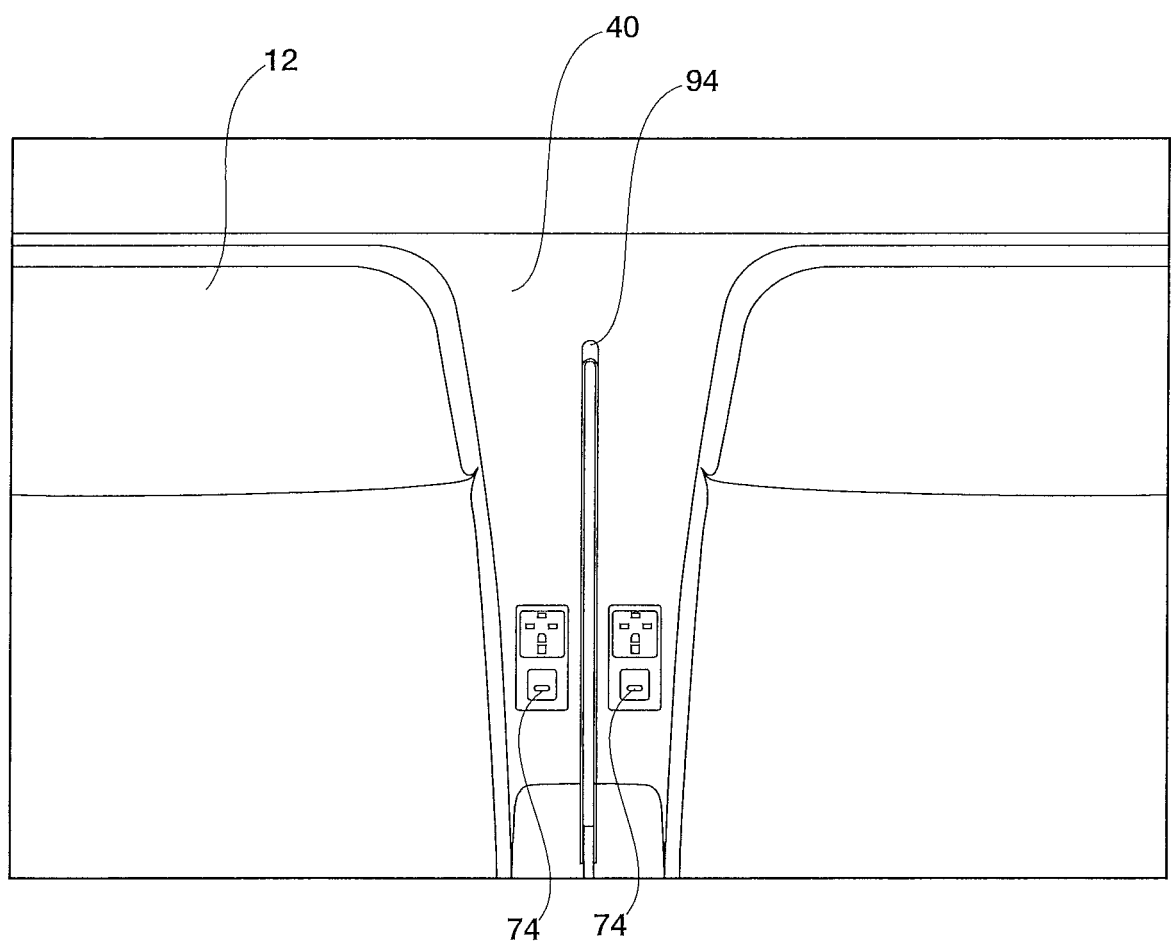
FIG. 9 is an enlarged front elevational view of another embodiment including a power outlet.

Other amenities may be included with seating assembly 10. For example, fixed outer shell 40 may also include a cocktail tray 72 adjacent to passenger seat 12 as seen in FIG. 8. One or more power outlets 74 may also be installed onto fixed outer shell 40, as seen in FIG. 9.

Figure 10:
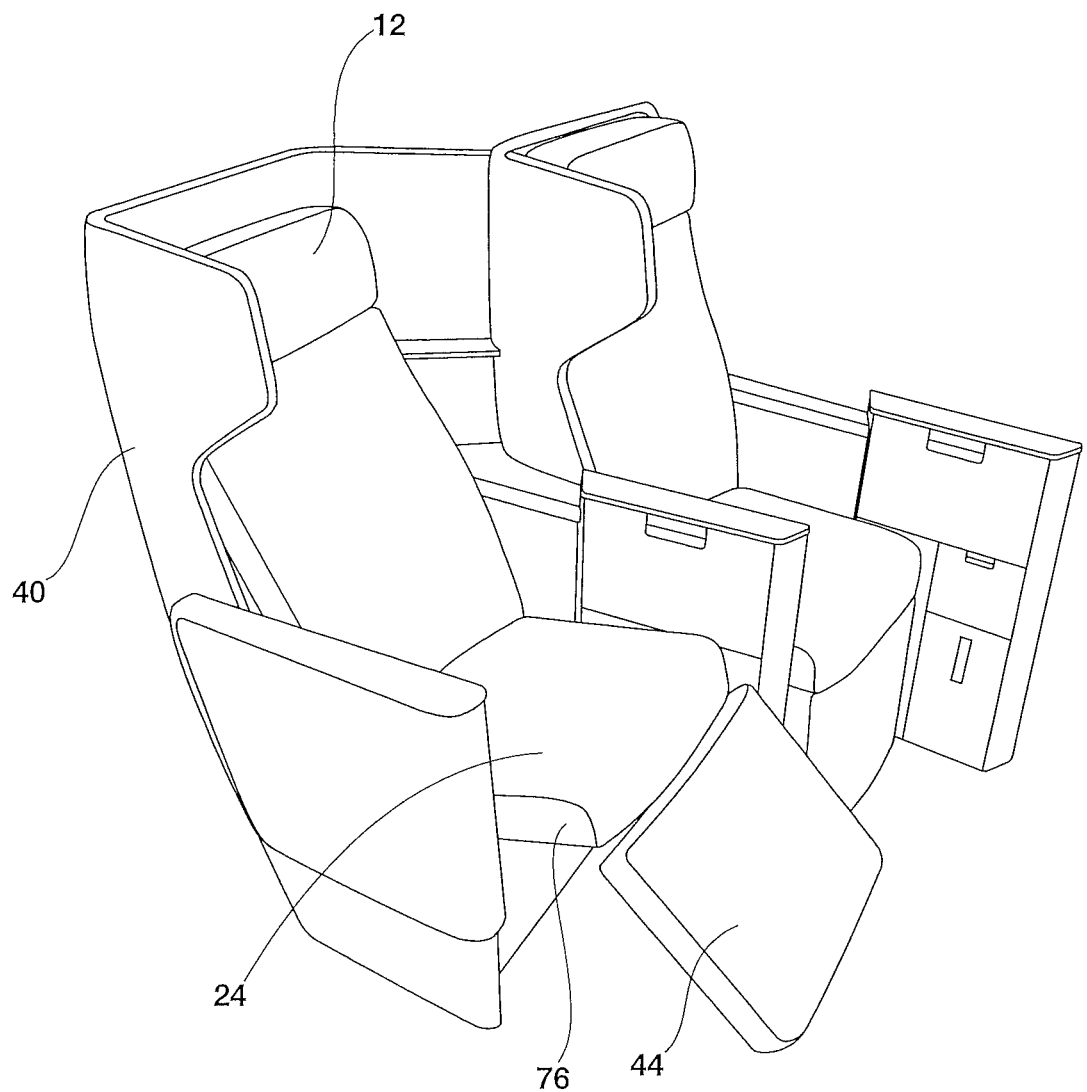
FIG. 10 is a front perspective view of one embodiment with the passenger seat in an inclined configuration.
Figure 11:
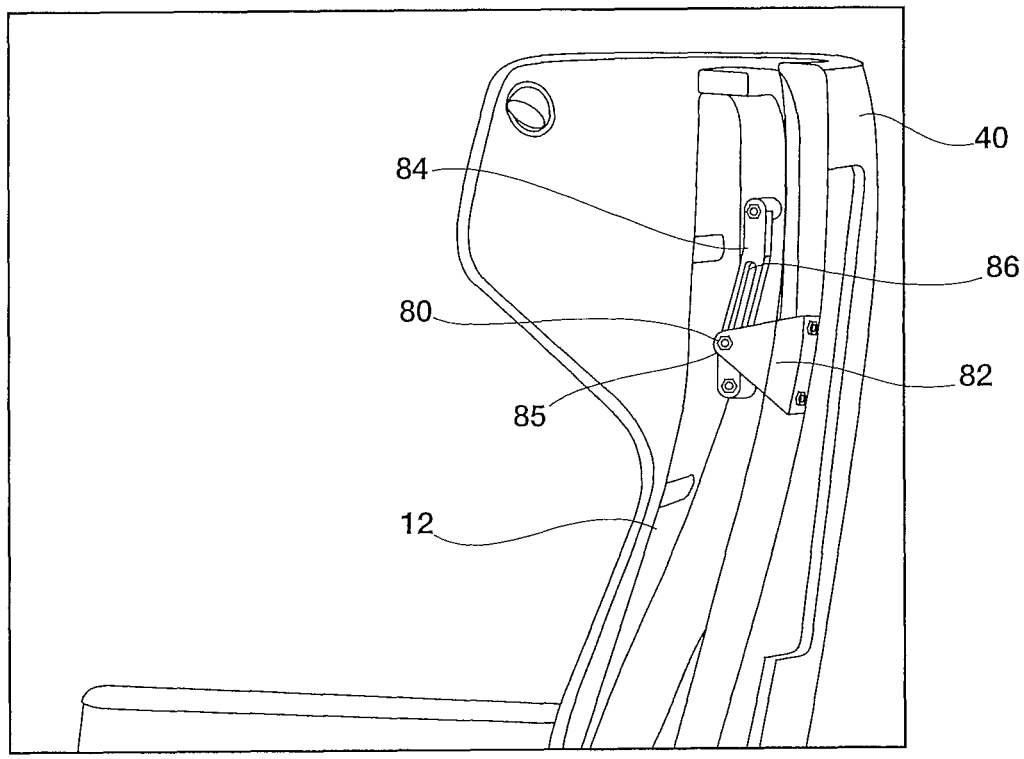
FIG. 11 is a side elevational cross-sectional view illustrating an embodiment having an attachment point between a passenger seat and a fixed outer shell partially surrounding the passenger seat.

Turning now to FIG. 10, seat bottom support assembly 24 includes an articulated seat pan 76 to provide for moving between a first upright position and a second reclined position. The second reclined position may be accomplished via an attachment point 80, as seen in FIG. 11, between the back of passenger seat 12 and fixed outer shell 40.

The attachment point 80 enables the passenger seat 12 to incline away from fixed outer shell 40 into the second reclined position. In the embodiment shown in FIG. 11, the attachment point comprises a pin 82 installed onto fixed outer shell 40 and a slot assembly 84 installed onto passenger seat 12. A first end 85 of the slot acts as a first stop wherein the passenger seat 12 is in its first upright position. The second end 86 of the slot acts as a second stop wherein the passenger seat 12 is in its second reclined position. As the passenger seat 12 inclines away into the second reclined position, fixed outer shell 40 remains stationary. The articulated seat pan 76 articulates forward and backward proportionally to the distance that pin 82 travels within the slot of slot assembly 84. In operation, passengers can recline the passenger seat 12 without reducing the leg space of other passengers since the fixed outer shell 40 retains its position at all times. Only the passenger's leg room is reduced when the passenger inclines passenger seat 12.

Figure 12:
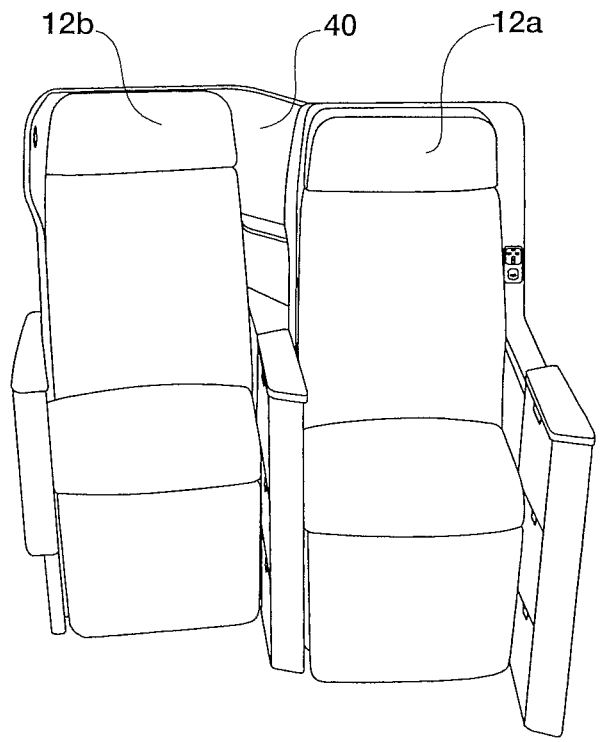
FIG. 12 is a front elevational view of one embodiment of a seating assembly comprised of two passenger seats.

Seating assembly 10 may include a plurality of passenger seats. As seen in FIG. 12, seating assembly 10 may include a first passenger seat 12a and a second passenger seat 12b. The second passenger seat 12b may be positioned away from first passenger seat 12a in a staggered configuration. The staggered arrangement in FIG. 12 enhances the passenger's perception of exclusiveness because passengers are not seat directly next to each other. The staggered layout also makes it easier for non-aisle passengers to egress, since the inner space is aligned with the furthest front point of the aisle seat space.

Figure 13:
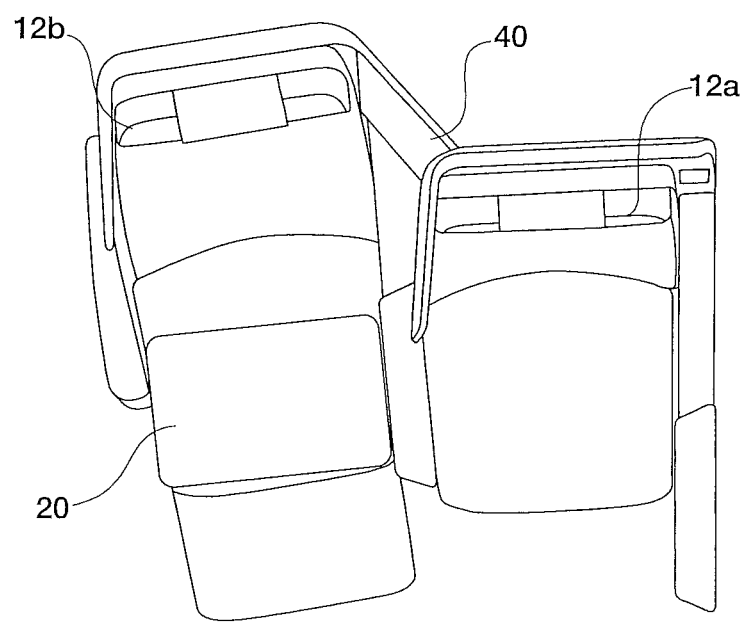
FIG. 13 is a top view of an embodiment of a seating assembly comprised of two passenger seats.
Figure 14:
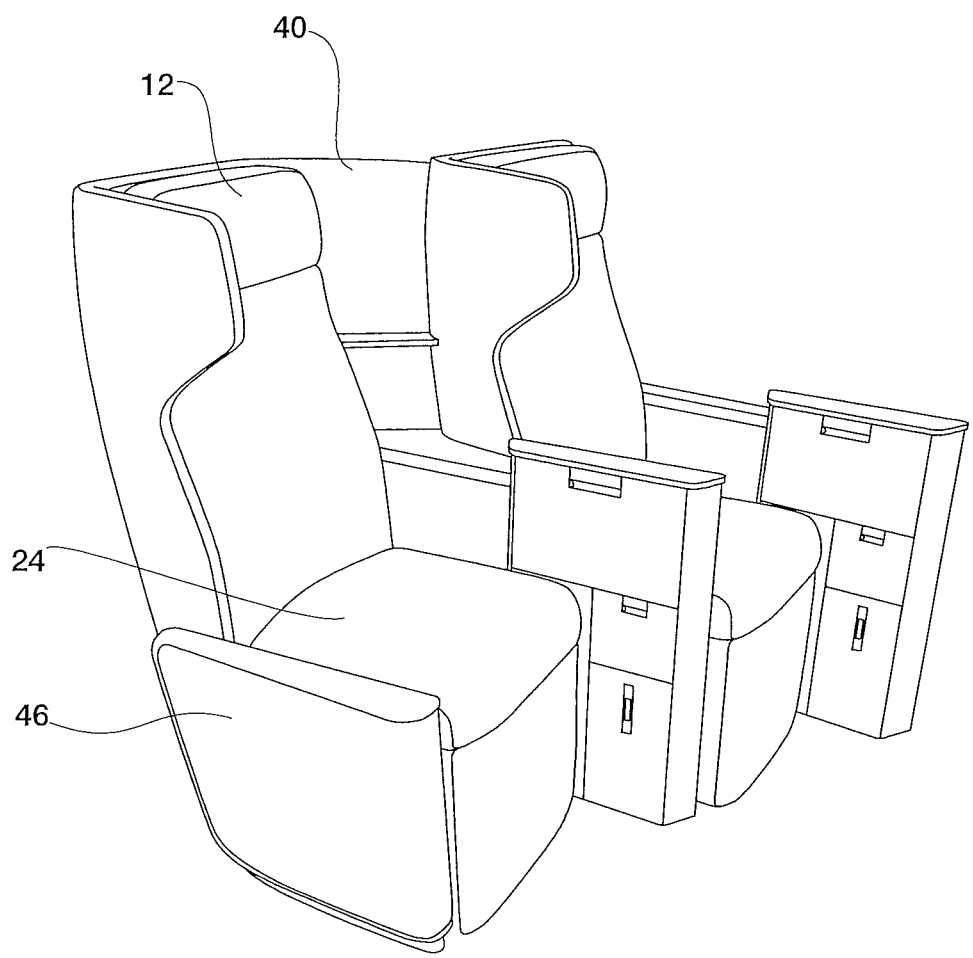
FIG. 14 is a front perspective view of one embodiment of a seating assembly wherein the armrest is lowered.

In some embodiments, second passenger seat 12b may be offset away from first passenger seat 12a. For example, as seen in FIG. 13, second passenger seat 12b may be offset from first passenger seat 12a by about 12 degrees. Preferably, second passenger seat 12b is placed adjacent to an aisle within the cabin of a passenger aircraft. The angled seat arrangement widens the aisle in the front part of the armrest in each row and effectively increases the usable width of the aisle, which may be especially useful during boarding and meal times. The staggered layout, combined with the outward facing angle of the second passenger seat, makes it easier for cabin crew to serve non-aisle seat passengers since the reach over distance is reduced. Seating assembly 10 may also include an armrest 46 that can be dropped to assist disabled passengers with entering passenger seat 12, as seen in FIG. 14.

Figure 15:
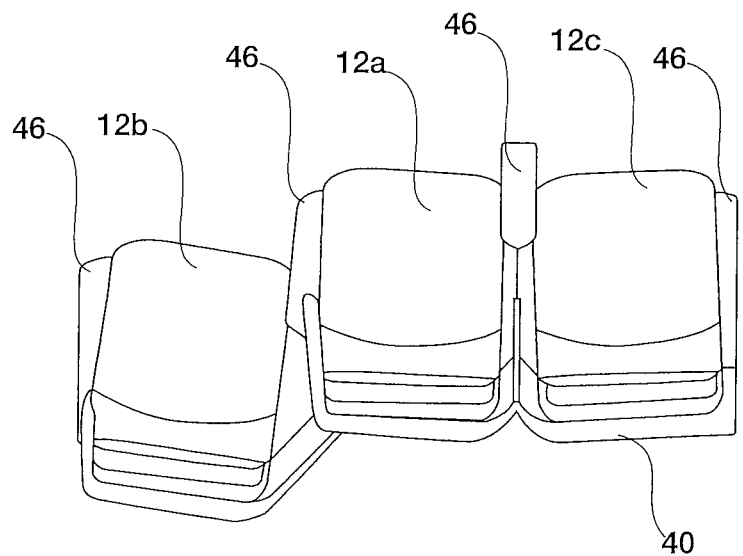
FIG. 15 is a top view of another embodiment of a seating assembly comprised of three passenger seats.

In another embodiment, the seating assembly 10 may further include a third passenger seat 12c, as seen in FIG. 15. The third passenger seat 12c may be positioned adjacent to the first passenger seat 12a at an opposing side away from second passenger seat 12b. The third passenger seat 12c is substantially parallel to the first passenger seat 12a, while the second passenger seat 12b is positioned away from both the first and third passenger seats to create a staggered configuration. In some embodiments, second passenger seat 12b may be offset away from first passenger seat 12a and third passenger seat 12c. For example, as seen in FIG. 15, second passenger seat 12b may be offset from first passenger seat 12a by about 12 degrees. Preferably, the second passenger seat 12b is placed adjacent to an aisle within the cabin of a passenger aircraft and the third passenger seat 12c is placed adjacent to the cabin sidewall.

Figure 16:
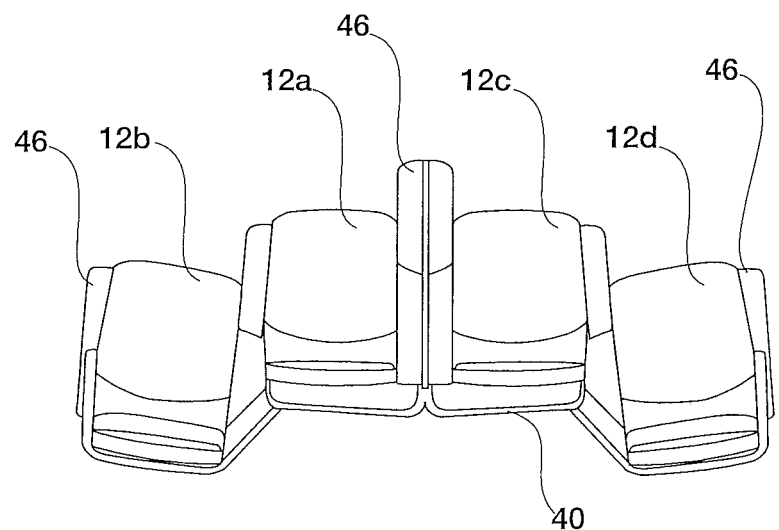
FIG. 16 is a top view of another embodiment of a seating assembly comprised of four passenger seats.

Yet in another embodiment, seating assembly 10 may also include a fourth passenger seat 12d, as seen in FIG. 16. The fourth passenger seat 12d may be positioned adjacent to the third passenger seat 12c at an opposing side away from the first passenger seat 12a. The fourth passenger seat 12d is positioned in a staggered configuration with respect to the third passenger seat 12c. In some embodiments, the fourth passenger seat 12d is offset away from the third passenger seat 12c. For example, the fourth passenger seat 12d may be offset by about 12 degrees from the third passenger seat 12c, as seen in FIG. 16. Preferably, the second passenger seat 12b and the fourth passenger seat 12*d* are placed adjacent to the aisles within the cabin of a passenger aircraft.

Figure 17:
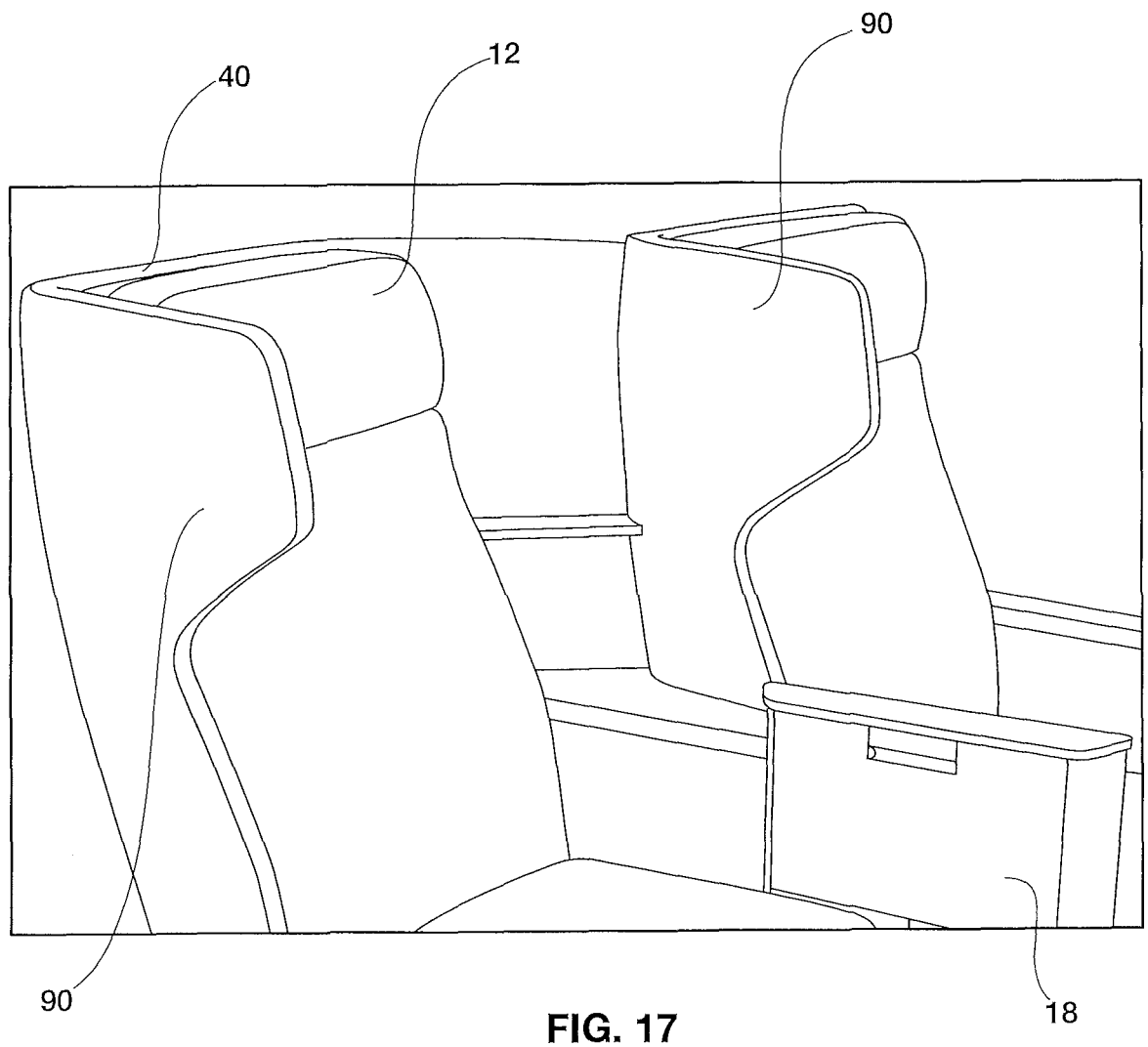
FIG. 17 is an enlarged perspective view of a seating assembly with blinders installed.
Figure 18:
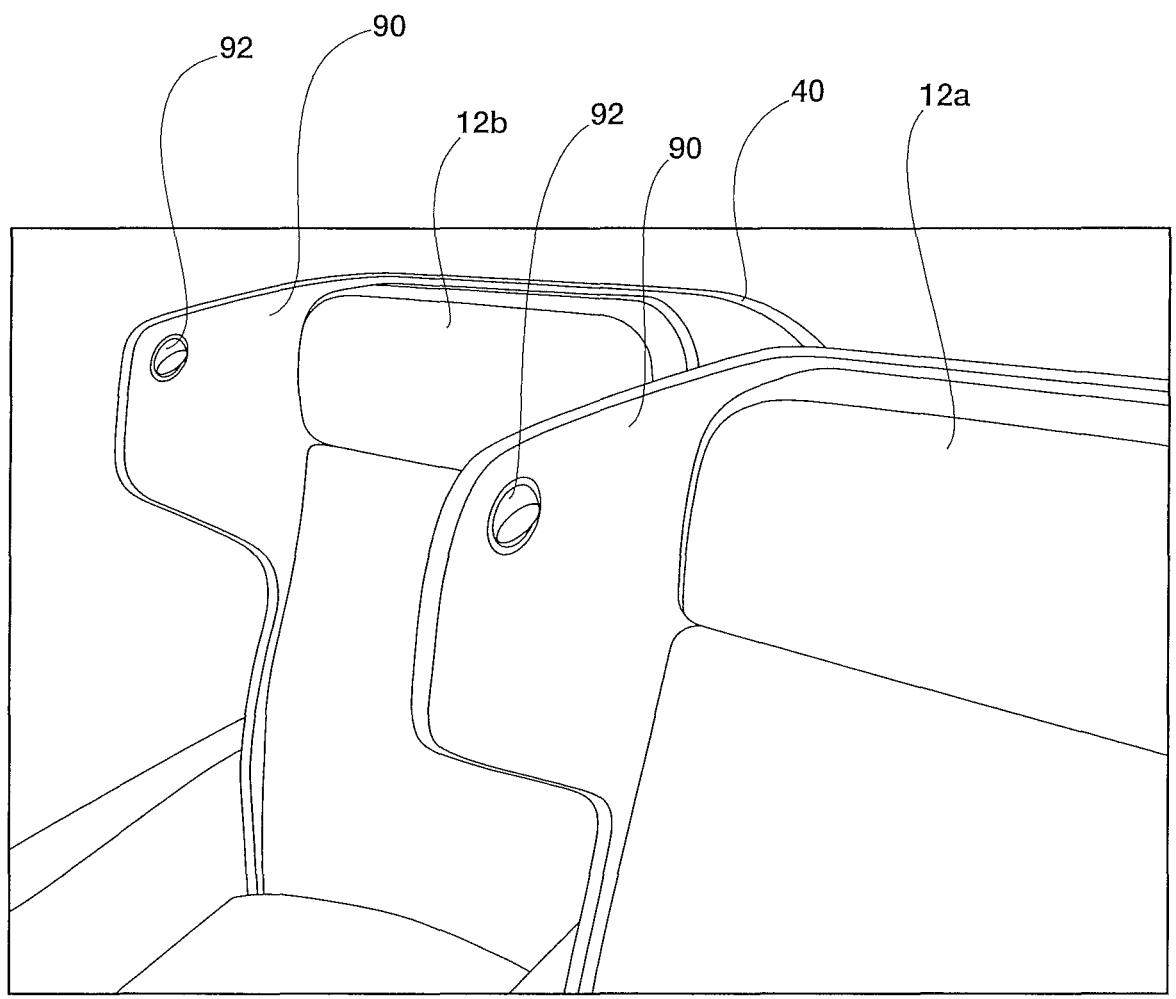
FIG. 18 is an enlarged perspective view of a seating assembly including reading lights.

Turning to FIG. 17, blinders 90 may be included for each passenger seat to block the passenger's view of other passengers for increased privacy. Blinders 90 may be placed on one or both sides of passenger seat 12. For example, a blinder 90 may be added to an aisle side of a passenger seat, between two passengers, or both. Blinders 90 may also be included on both sides for passenger seats adjacent to a cabin sidewall. As seen in FIG. 18, blinders 90 may also include a personal reading light 92.

Figure 19:
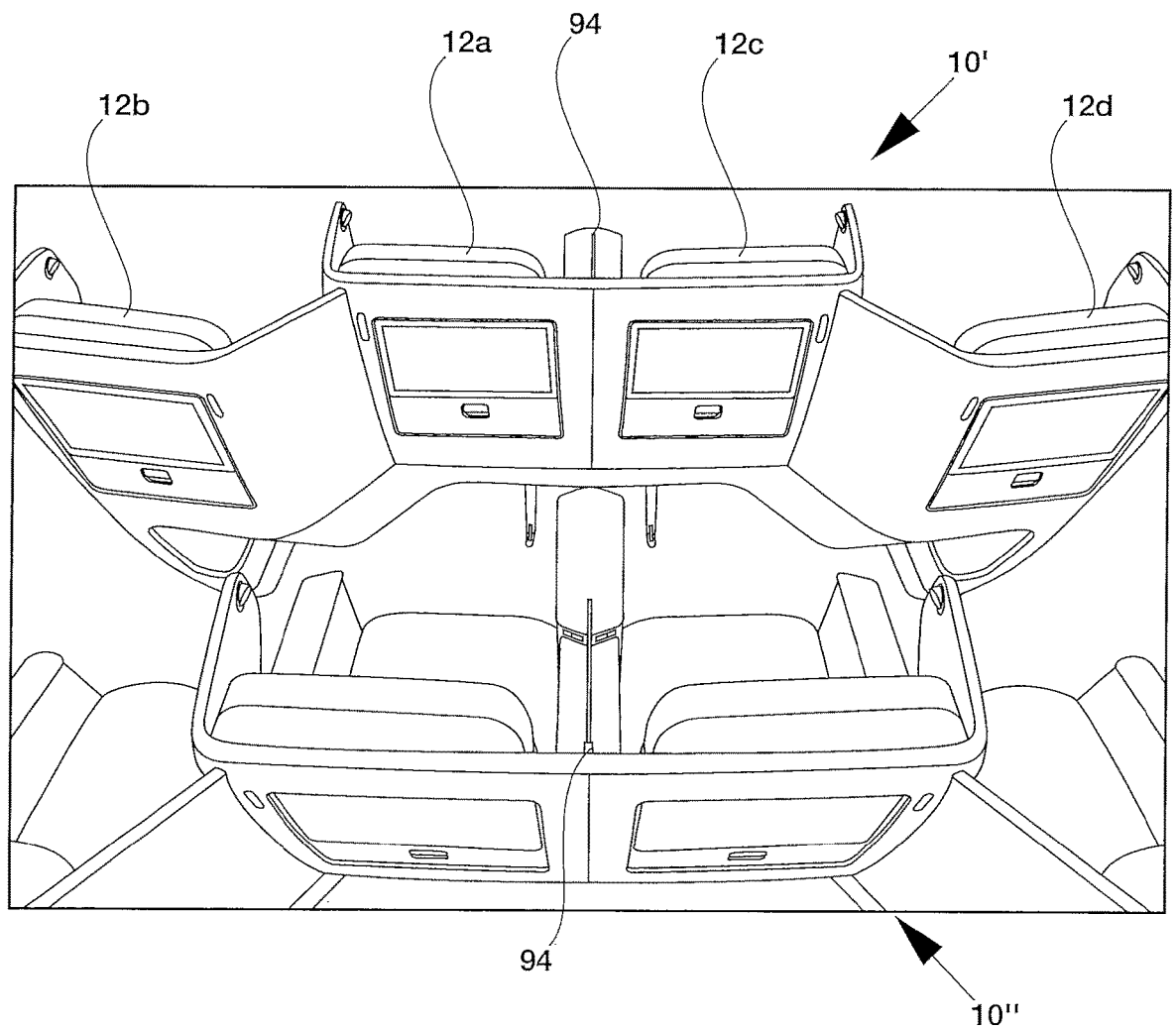
FIG. 19 is a rear perspective overhead view of two seating assemblies each comprising four passenger seats.

FIG. 19 illustrates a pair of seating assemblies wherein each seating assembly comprises a set of four passenger seats. The top perspective view shows the pair of seating assemblies placed substantially parallel so that each passenger seat includes an equal amount of legroom despite the staggered configuration and offsetting. While the second passenger seat 12*b* and fourth passenger seat 12*d* are staggered and include blinders 90 to create a private environment for each passenger, the center passenger seats 12*a* and 12*c* are placed adjacent to each other for passengers who wish to sit side by side. A stowable privacy screen 94 may be inserted between passenger seats 12*a* and 12*c* to give passengers the option of having a private space or a shared space.

Figure 20A:
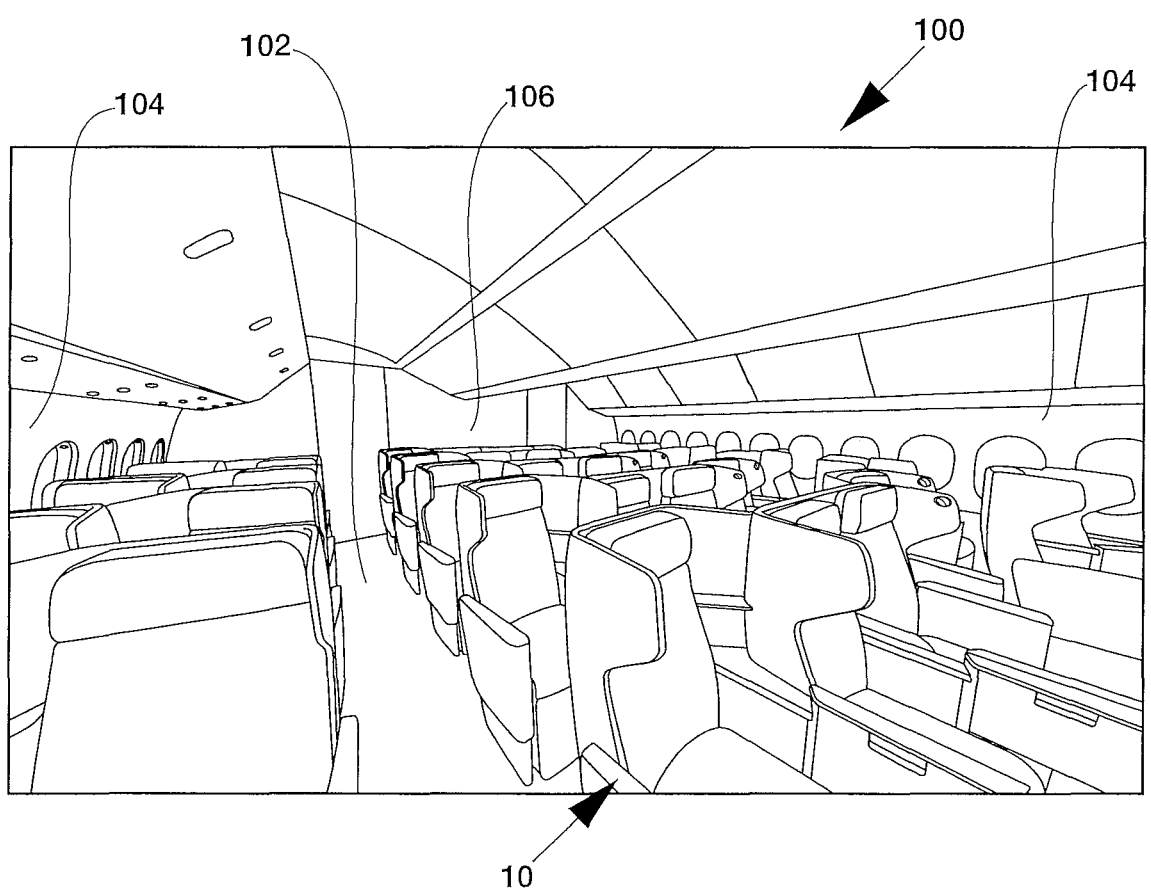
FIG. 20A is an enlarged front perspective view of a passenger aircraft with various embodiments of seating assemblies installed.
Figure 20B:
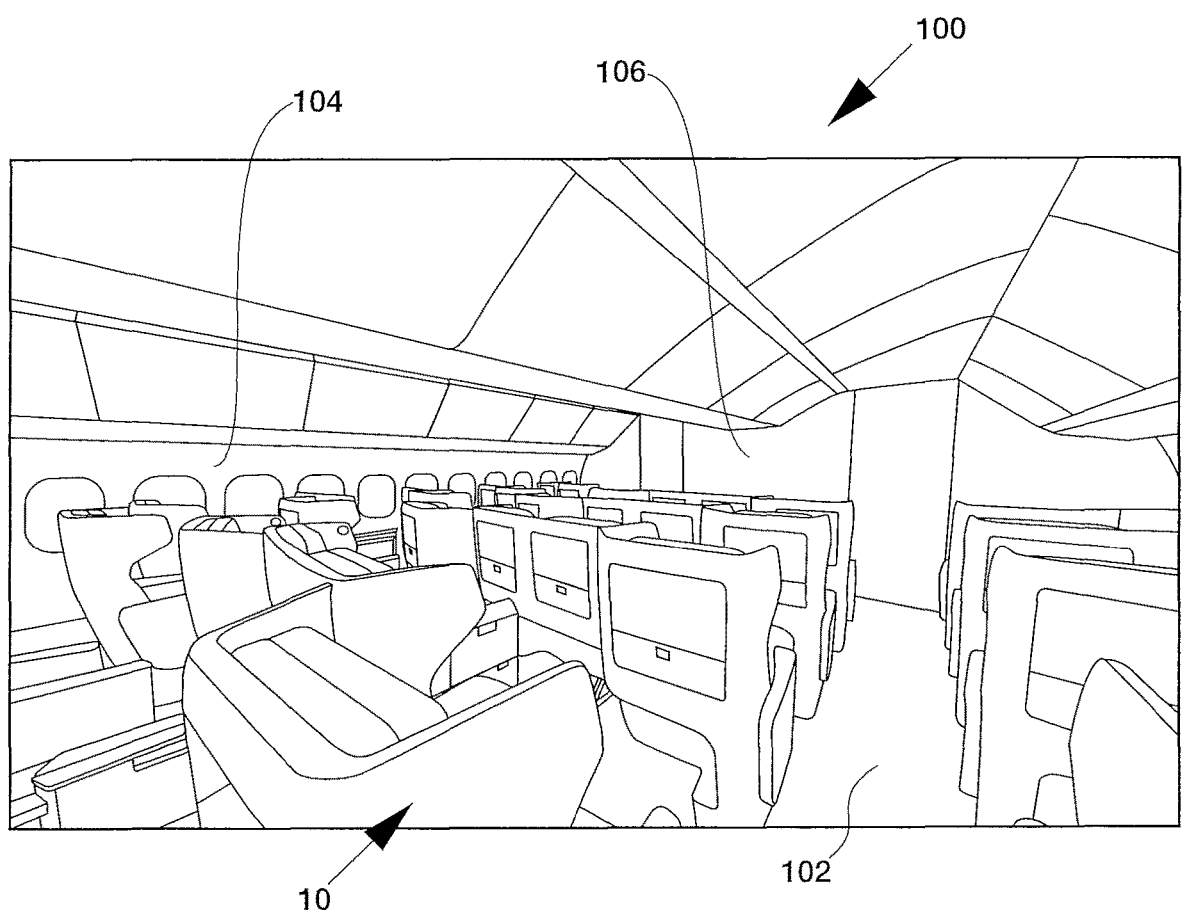
FIG. 20B is an enlarged rear perspective view of the embodiment in FIG. 20A.

In operation, the staggered configuration of seating assembly 10 enables it to be placed in various layouts within a cabin that increases the amount of passengers to be accommodated within a given space, while maintaining a private and spacious experience for each passenger. FIGS. 20A and 20B depict examples of a cabin having a plurality of seating assemblies. In the examples shown, seating assemblies having a pair of two seats are placed at the cabin sidewalls. Seating assemblies having four seats per assembly are placed at the center of the cabin. Each staggered seat is placed adjacent to an aisle to facilitate access for cabin crew.

Figure 21:
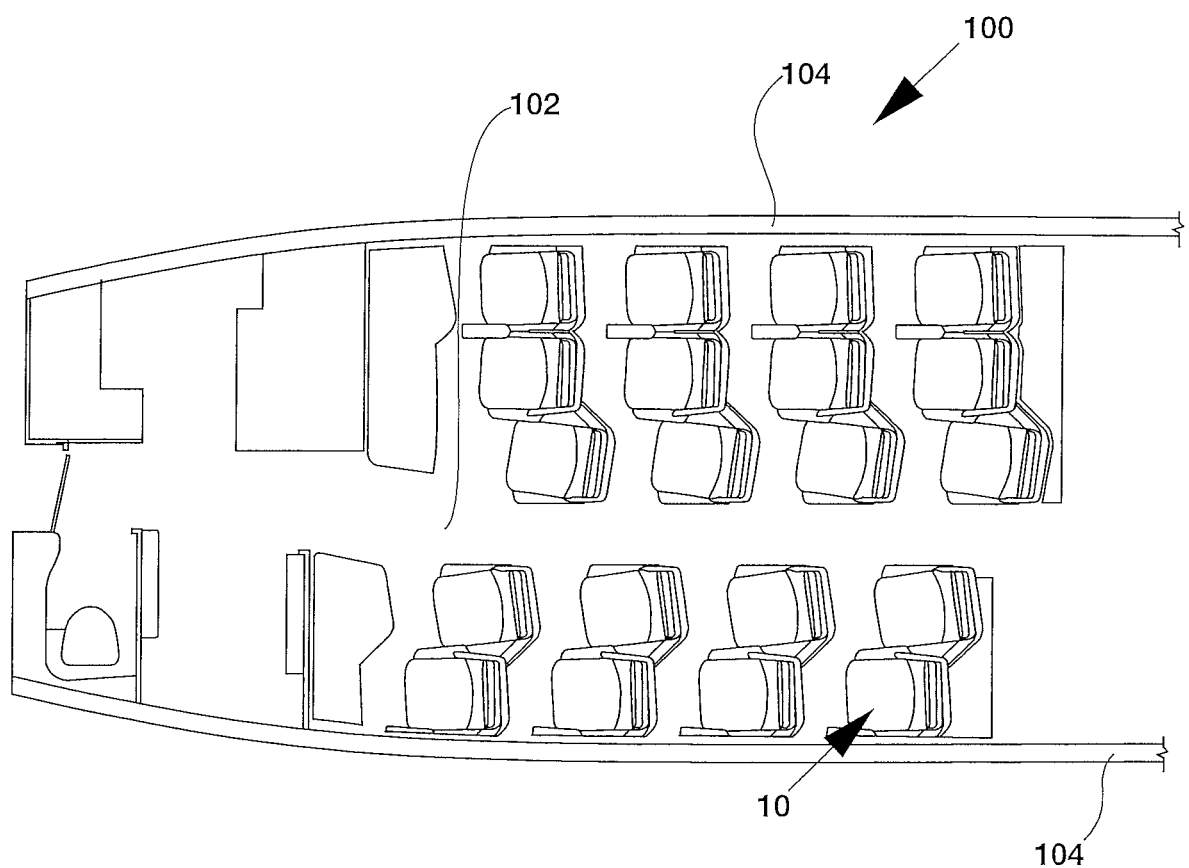
FIG. 21 is a schematic illustrating one configuration of a passenger aircraft cabin with various embodiments of seating assemblies installed.
Figure 22:
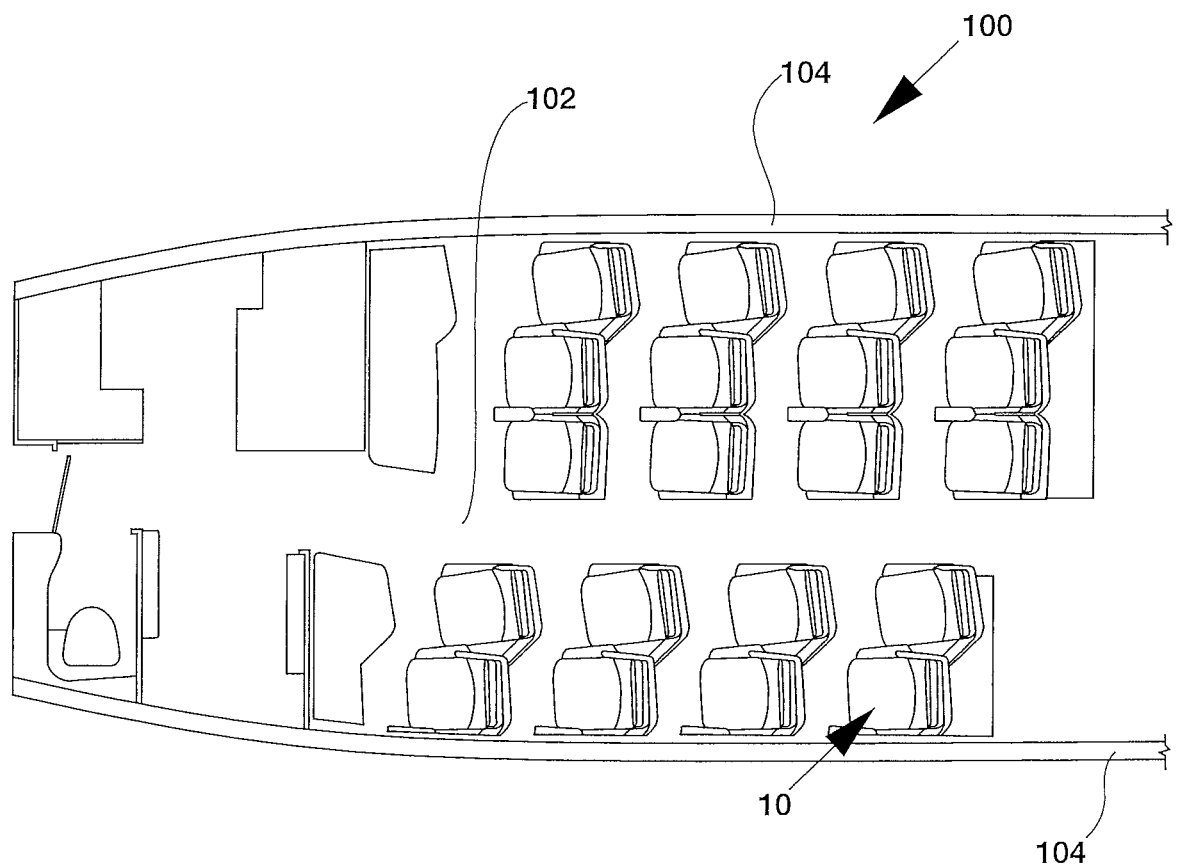
FIG. 22 is a schematic illustrating another configuration of a passenger aircraft cabin with various embodiments of seating assemblies installed.

FIG. 21 illustrates another seating arrangement for a plurality of seating assemblies. In the example shown, each seat is about 20 inches wide. Staggered and offset seats are placed adjacent to the aisle, and remain approximately 17 inches apart. The pitch between seats is about 40 inches, although in other configurations, may be higher. FIG. 22 depicts another seating arrangement wherein a first set of seating assemblies include a staggered seat adjacent to the aisle in each row, and a second set of seating assemblies wherein the staggered seats are positioned adjacent to the cabin sidewall.

Certain modifications and improvements will occur to those skilled in the art upon a reading of the foregoing description. It should be understood that all such modifications and improvements have been deleted herein for the sake of conciseness and readability but are properly within the scope of the following claims.

We claim:

1. A seating assembly for a passenger aircraft, said seating assembly comprising:
    (a) a first passenger seat being offset from a second passenger seat, said first passenger seat having an articulated seat pan moving said first passenger seat between a first upright position and a second reclined position, wherein said first passenger seat includes a back;
    (b) a fixed outer privacy shell configured to partially surround said first passenger seat and includes at least one rear wall, a base attached to a floor of said passenger aircraft receiving said first passenger seat, and a top portion;
    (c) a space and an upper attachment point between said back of said first passenger seat and said top portion of said fixed outer privacy shell, said upper attachment point configured to incline said first passenger seat away from said fixed outer privacy shell into said second reclined position, wherein said upper attachment point comprises a slot assembly installed onto an upper portion of said back of said first passenger seat having a single slot and a pin assembly installed onto said fixed outer privacy shell such that said pin assembly is positioned above said articulated seat pan of said first passenger seat in said second reclined position, said pin assembly comprising a pin located within said slot assembly,
    (d) a center console within said fixed outer privacy shell and located adjacent to said first passenger seat, and
        wherein said fixed outer privacy shell being independent of said articulated seat pan in said second reclined position.

2. The seating assembly according to claim 1 further including a stowable tray installed onto said center console, wherein said stowable tray is adapted to be positioned between a first stowable position and a second deployed position.

3. The seating assembly according to claim 2 further including a literature pocket installed below an armrest of said first passenger seat and adjacent to said center console.

4. The seating assembly according to claim 3 further including a storage unit on said center console, said storage unit having an open configuration adapted to insert and remove one or more items and a closed configuration adapted to stow and secure said items.

5. The seating assembly according to claim 1 further including a storage space installed onto a back of said fixed outer privacy shell behind said first passenger seat and adapted to store electronic devices and literature, wherein said storage space further includes a display.

6. The seating assembly according to claim 1, wherein said pin assembly is installed onto said fixed outer privacy shell such that a distance between said base and said pin assembly is greater than a distance between said base and said articulated seat pan.

7. The seating assembly according to claim 5 further including a stowable clamshell holder for a personal electronic device adapted to be movable between a first stowable position and a second deployed position, wherein said storage space is accessible when said stowable clamshell holder is in said second deployed position.

8. The seating assembly according to claim 7, wherein said stowable clamshell holder is adapted to hold a first personal electronic device having a first size and a second personal electronic device having a second size.

9. The seating assembly according to claim 7 further including a cavity installed on said stowable clamshell holder adapted for holding a beverage.

10. The seating assembly according to claim 1 further including a power outlet installed onto said fixed outer privacy shell, wherein said power outlet comprises a USB power outlet.

11. A seating assembly for a passenger aircraft comprising:
    (a) a plurality of passenger seats including a first passenger seat and a second passenger seat, wherein said second passenger seat is configured to be offset away from said first passenger seat, wherein each of said passenger seats includes an articulated seat pan moving each of said passenger seats between a first upright position and a second reclined position, wherein each of said passenger seats includes a back, and wherein said second passenger seat is positioned in a staggered and angled configuration with respect to said first passenger seat;

(b) a fixed outer privacy shell partially surrounds each of said passenger seats and includes at least one rear wall, a base fixedly attached to a floor of said passenger aircraft receiving each of said passenger seats, and a top portion; and (c) an attachment point adjacent to said back of each of said passenger seats and said top portion of said fixed outer privacy shell, said attachment point having a slot assembly installed onto said back of each of said passenger seats and a pin assembly installed onto said fixed outer privacy shell such that said pin assembly is positioned above said articulated seat pan of each of said passenger seats in said second reclined position, wherein said pin assembly comprises a pin located within said slot assembly, (d) a center console within said fixed outer privacy shell and located adjacent to each of said passenger seats, and wherein said articulated seat pan of each of said passenger seats is configured to articulate forward and backward substantially proportional to a distance said pin travels within said slot assembly, and wherein said fixed outer privacy shell is independent of said articulated seat pan of each of said passenger seats in said second reclined position, and wherein said pin assembly translocates within a slot on said slot assembly to adjust an incline of each of said passenger seats.

12. The seating assembly according to claim 11 further including a leg rest having a closed configuration and an extended configuration.

13. The seating assembly according to claim 11, wherein said fixed outer privacy shell is at least partially comprised of fiberglass.

14. The seating assembly according to claim 13 further including a foot step installed on a back of said fixed outer privacy shell adapted to facilitate a passenger exiting a passenger seat located behind said first passenger seat and said second passenger seat.

15. The seating assembly according to claim 14 further including a cocktail tray inserted in between said first passenger seat and said second passenger seat within said fixed outer privacy shell.

16. The seating assembly according to claim 11 further including a blinder installed on said fixed outer privacy shell and positioned adjacent to a headrest of each of said passenger seats, wherein said blinder includes a reading light.

17. The seating assembly according to claim 15, wherein said pin assembly is installed onto said fixed outer privacy shell such that a distance between said floor and said pin assembly is greater than a distance between said floor and said articulated seat pan.

18. The seating assembly according to claim 11 further including a third passenger seat positioned adjacent to said first passenger seat at an opposing side away from said second passenger seat, wherein said third passenger seat is substantially parallel to said first passenger seat.

19. The seating assembly according to claim 18 further including a fourth passenger seat positioned adjacent to said third passenger seat at an opposing side away from said first passenger seat, wherein said fourth passenger seat is positioned in a staggered configuration with respect to said third passenger seat.

20. The seating assembly according to claim 19, wherein said fourth passenger seat is offset away from said third passenger seat.

21. The seating assembly according to claim 11, wherein said articulated seat pan of said first passenger seat includes a front end and a back end and said articulated seat pan of said second passenger seat includes a front end, and wherein said second passenger seat is configured to be offset from said first passenger seat such that said front end of said articulated seat pan of said second passenger seat is aligned with a point between said front end and said back end of said articulated seat pan of said first passenger seat.

22. The seating assembly according to claim 21 further including a privacy screen between said first passenger seat and said second passenger seat, wherein said privacy screen is adapted to be movable between a first storage position and a second deployed position.

23. A seating assembly for a passenger aircraft, said seating assembly comprising:

(a) a plurality of passenger seats including a first passenger seat and a second passenger seat, each of said passenger seats having an articulated seat pan to provide for moving each of said passenger seats between a first upright position and a second reclined position, and wherein said second passenger seat is positioned in a staggered configuration with respect to said first passenger seat;

(b) a fixed outer privacy shell configured to partially surround each of said passenger seats and includes at least one rear wall and a base attached to a floor of said passenger aircraft for receiving each of said passenger seats, wherein said fixed outer privacy shell is configured to be independent of each of said passenger seats having said articulated seat pan in said second reclined position;

(c) a pin assembly configured to incline each of said passenger seats to said second reclined position, wherein said pin assembly is coupled to said fixed outer privacy shell such that said pin assembly is positioned above said articulated seat pan in said second reclined position; and (d) a center console within said fixed outer privacy shell and located adjacent to each of said passenger seats.

24. The seating assembly according to claim 23 further including a stowable tray installed onto said center console, wherein said stowable tray is adapted to be positioned between a first stowable position and a second deployed position.

25. The seating assembly according to claim 24 further including a literature pocket installed below an armrest of each of said passenger seats and adjacent to said center console.

26. The seating assembly according to claim 25 further including a storage unit on said center console, said storage unit having an open configuration adapted to insert and remove one or more items and a closed configuration adapted to stow and secure said items.

27. The seating assembly according to claim 23 further including a storage space installed onto a back of said fixed outer privacy shell behind each of said passenger seats and adapted to store electronic devices and literature.

28. The seating assembly according to claim 27 further including a display within said storage space.

29. The seating assembly according to claim 27 further including a stowable clamshell holder for a personal electronic device adapted to be movable between a first stowable position and a second deployed position, wherein said storage space is accessible when said stowable clamshell holder is in said second deployed position.

30. The seating assembly according to claim 29, wherein said stowable clamshell holder is adapted to hold a first personal electronic device having a first size and a second personal electronic device having a second size.

31. The seating assembly according to claim 29 further including a cavity installed on said stowable clamshell holder adapted for holding a beverage.

32. The seating assembly according to claim 23 further including a power outlet installed onto said fixed outer privacy shell.

33. The seating assembly according to claim 32, wherein said power outlet comprises a USB power outlet.

34. The seating assembly according to claim 23 further including an attachment point adjacent a back of each of said passenger seats and a top portion of said fixed outer privacy shell adapted to incline each of said passenger seats away from said fixed outer privacy shell.

35. The seating assembly according to claim 34, wherein said attachment point comprises a slot assembly installed onto said back of each of said passenger seats, wherein each of said pin assembly includes a pin disposed within a slot on each of said slot assembly to adjust the incline of each of said passenger seats.

36. The seating assembly according to claim 35, wherein said second reclined position includes said articulated seat pan articulating to a distance proportional to the incline of each of said passenger seats and said pin assembly remains positioned above said articulated seat pan.

37. The seating assembly according to claim 36 further including a leg rest having a closed configuration and an extended configuration.

38. The seating assembly according to claim 23, wherein said fixed outer privacy shell is at least partially comprised of fiberglass.

39. The seating assembly according to claim 38 further including a foot step installed on a back of said fixed outer privacy shell adapted to facilitate a passenger exiting a passenger seat located behind said first passenger seat and said second passenger seat.

40. The seating assembly according to claim 39 further including a cocktail tray inserted in between said first passenger seat and said second passenger seat within said fixed outer privacy shell.

41. The seating assembly according to claim 23 further including a blinder installed on said fixed outer privacy shell and positioned adjacent to a headrest of each of said passenger seats.

42. The seating assembly according to claim 41 further including a reading light installed on said blinder.

43. The seating assembly according to claim 40, wherein said second passenger seat is offset at an outward facing angle away from said first passenger seat.

44. The seating assembly according to claim 43, wherein said articulated seat pan of said first passenger seat includes a front end and a back end and said articulated seat pan of said second passenger seat includes a front end, and wherein said second passenger seat is configured to be offset from said first passenger seat such that said front end of said articulated seat pan of said second passenger seat is aligned with a point between said front end and said back end of said articulated seat pan of said first passenger seat.

45. The seating assembly according to claim 23 further including a third passenger seat positioned adjacent to said first passenger seat at an opposing side away from said second passenger seat, wherein said third passenger seat is substantially parallel to said first passenger seat.

46. The seating assembly according to claim 45 further including a fourth passenger seat positioned adjacent to said third passenger seat at an opposing side away from said first passenger seat, wherein said fourth passenger seat is positioned in a staggered configuration with respect to said third passenger seat.

47. The seating assembly according to claim 46, wherein said fourth passenger seat is offset away from said third passenger seat.

48. The seating assembly according to claim 47, wherein said articulated seat pan of said third passenger seat includes a front end and a back end and said articulated seat pan of said fourth passenger seat includes a front end, and wherein said fourth passenger seat is offset from said third passenger seat such that said front end of said articulated seat pan of said fourth passenger seat is aligned with a point between said front end and said back end of said articulated seat pan of said third passenger seat.

49. The seating assembly according to claim 48 further including a privacy screen between said first passenger seat and said third passenger seat, wherein said privacy screen is adapted to be movable between a first storage position and a second deployed position.

\* \* \* \* \*